(12) United States Patent
Shanton et al.

(10) Patent No.: US 8,517,075 B2
(45) Date of Patent: Aug. 27, 2013

(54) MACHINE AND METHOD FOR FORMING A HEAT-REFLECTIVE BLANK AND CONTAINER

(75) Inventors: Kenneth John Shanton, West Chicago, IL (US); Paul Charles Haschke, Wheaton, IL (US)

(73) Assignee: RockTenn CP, LLC, Norcross, GA (US)

( * ) Notice: Subject to any disclaimer, the term of this patent is extended or adjusted under 35 U.S.C. 154(b) by 191 days.

(21) Appl. No.: 12/855,373

(22) Filed: Aug. 12, 2010

(65) Prior Publication Data

US 2012/0040815 A1    Feb. 16, 2012

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ............ 156/521; 156/557; 156/566; 156/570

(58) Field of Classification Search
USPC ........... 156/264, 521, 557, 566, 570; 271/69, 271/207
See application file for complete search history.

(56) References Cited

U.S. PATENT DOCUMENTS

| | | | |
|---|---|---|---|
| 2,705,514 A * | 4/1955 | Reece | 156/555 |
| 2,969,105 A * | 1/1961 | Jones | 156/216 |
| 3,048,088 A * | 8/1962 | Fischer et al. | 493/344 |
| 3,527,460 A * | 9/1970 | Lopez | 271/69 |
| 4,190,757 A | 2/1980 | Turpin et al. | |
| 4,441,626 A | 4/1984 | Hall | |
| 5,052,369 A | 10/1991 | Johnson | |
| 5,338,921 A | 8/1994 | Maheux et al. | |
| 5,445,286 A | 8/1995 | Guimarin | |
| 6,196,448 B1 | 3/2001 | Correll | |
| 2003/0017243 A1 | 1/2003 | Goldman et al. | |
| 2003/0203087 A1 | 10/2003 | Goldman et al. | |
| 2005/0115944 A1 | 6/2005 | Goldman et al. | |
| 2006/0140746 A1 * | 6/2006 | Koon | 413/25 |
| 2007/0131667 A1 | 6/2007 | Amato | |
| 2009/0078698 A1 | 3/2009 | Middleton et al. | |

* cited by examiner

*Primary Examiner* — Linda L Gray
(74) *Attorney, Agent, or Firm* — Armstrong Teasdale LLP

(57) ABSTRACT

A machine for continuously forming heat-reflective blanks is provided. The heat-reflective blanks each include a blank of sheet material and a thermal film patch coupled to the blank. The machine includes an intake station configured to align a first blank of sheet material and a second blank of sheet material for application of a first thermal film patch and a second thermal film patch, respectively. The intake station is further configured to maintain a spacing between the first blank and the second blank. The intake station includes adjustable hold-down bars for maintaining an alignment and the spacing of the first and second blanks. The machine also includes an applicator station configured to apply the first and second thermal film patches to the first and second blanks, respectively, to form a first heat-reflective blank and a second heat-reflective blank, and an ejection station configured to eject the heat-reflective blanks.

17 Claims, 17 Drawing Sheets

MACHINE AND METHOD FOR FORMING A HEAT-REFLECTIVE BLANK AND CONTAINER

BACKGROUND OF THE INVENTION

The embodiments described herein relate generally to a blank of sheet material having a thermal film coupled thereto and, more particularly, to a machine and method for applying the thermal film to a blank of sheet material for forming a heat-reflective blank.

At least some known containers are used for storing and/or transporting a heated or cooled product therein. At least one such container includes a radiant barrier coupled to an interior and/or exterior surface of a top panel. The radiant barrier reflects heat back to the product within the container to facilitate maintaining the temperature of the product. However, such containers have been prevented from entering the market because mass production of such containers has not been possible. More specifically, cutting the radiant barrier and coupling the radiant barrier to the blank have been too time consuming and/or costly for mass production.

As such, it is desirable to provide a method for mass producing a heat-reflective container for retaining heat within the container. Further, it is desirable to provide a method for coupling a heat-reflective film to a blank that is time and cost effective.

BRIEF DESCRIPTION OF THE INVENTION

In one aspect, a machine for continuously forming heat-reflective blanks is provided. The heat-reflective blanks each include a blank of sheet material and a thermal film patch coupled to the blank of sheet material. The machine includes an intake station configured to align a first blank of sheet material and a second blank of sheet material for application of a first thermal film patch and a second thermal film patch, respectively. The intake station is further configured to maintain a spacing between the first blank and the second blank. The intake station comprising adjustable hold-down bars for maintaining an alignment and the spacing of the first and second blanks. The machine also includes an applicator station configured to apply the first and second thermal film patches to the first and second blanks, respectively, to form a first heat-reflective blank and a second heat-reflective blank, and an ejection station configured to eject the first and second heat-reflective blanks from the machine.

In another aspect, a machine for forming a heat-reflective blank is provided. The heat-reflective blank includes a blank of sheet material and a thermal film patch coupled to the blank. The machine includes a separator, a glue applicator, a film applicator, and an exit conveyor. The separator includes a spacing conveyor and hold-down bars. The hold-down bars are adjustable with respect to the spacing conveyor to maintain at least one of an alignment and a position of a blank on the spacing conveyor. The glue applicator is configured to apply glue to a surface of at least one of the blank and the thermal film patch. The film applicator is configured to apply the thermal film patch to the blank using the glue to adhere the thermal film patch to the blank to form the heat-reflective blank. The exit conveyor is configured to remove the heat-reflective blank from the machine.

In yet another aspect, a method for forming a heat-reflective blank including a blank of sheet material and a thermal film patch coupled to the blank is provided. The method is performed using a machine. The method includes applying glue to at least one of the blank and the thermal film patch using a glue applicator coupled to the machine, positioning the thermal film patch to a predetermined location relative to the blank, and applying the thermal film patch to the blank in the predetermined location using a film roller coupled to the machine to form the heat-reflective blank, wherein the thermal film patch is adhered to the blank by the applied glue.

BRIEF DESCRIPTION OF THE DRAWINGS

FIG. 1 is a top plan view of a heat-reflective blank of sheet material for constructing a heat-reflective container, according to one embodiment of the present invention.

FIG. 2 is a perspective view of a heat-reflective container formed from the blank shown in FIG. 1.

FIG. 3 is a side view of a machine for forming the heat-reflective blank shown in FIG. 1.

FIG. 4 is a schematic side view of the machine shown in FIG. 3.

FIG. 5 is a perspective view of an intake station that may be used with the machine shown in FIGS. 3 and 4.

FIG. 6 is a perspective view of a separator that may be used with the intake station shown in FIG. 5.

FIG. 7 is a perspective view of a glue applicator that can be used with the machine shown in FIGS. 3 and 4.

FIG. 8 is a side perspective view of an applicator station that can be used with the machine shown in FIGS. 3 and 4.

FIG. 9 is a rear perspective view of the applicator station shown in FIGS. 7 and 8.

FIG. 10 is a perspective view of rolls of thermal film that may be used with the applicator station shown in FIGS. 7-9.

FIG. 11 is a front perspective view of the applicator station shown in FIGS. 7-10.

FIG. 12 is a rear perspective view of an ejection station that may be used with the machine shown in FIGS. 3 and 4.

FIG. 13 is a side perspective view of an accumulator that may be used with the ejection station shown in FIG. 12.

FIG. 14 is a side perspective view of the ejection station shown in FIGS. 12 and 13.

FIG. 15 is a perspective view of hold-down rollers that may be used with the ejection station shown in FIGS. 12-14.

FIG. 16 is a side perspective view of an exit conveyor that may be used with the ejection station shown in FIGS. 12-14.

FIG. 17 is a schematic side view of an alternative embodiment of a machine for forming a heat-reflective blank shown in FIG. 1.

DETAILED DESCRIPTION OF THE INVENTION

Figure 1:
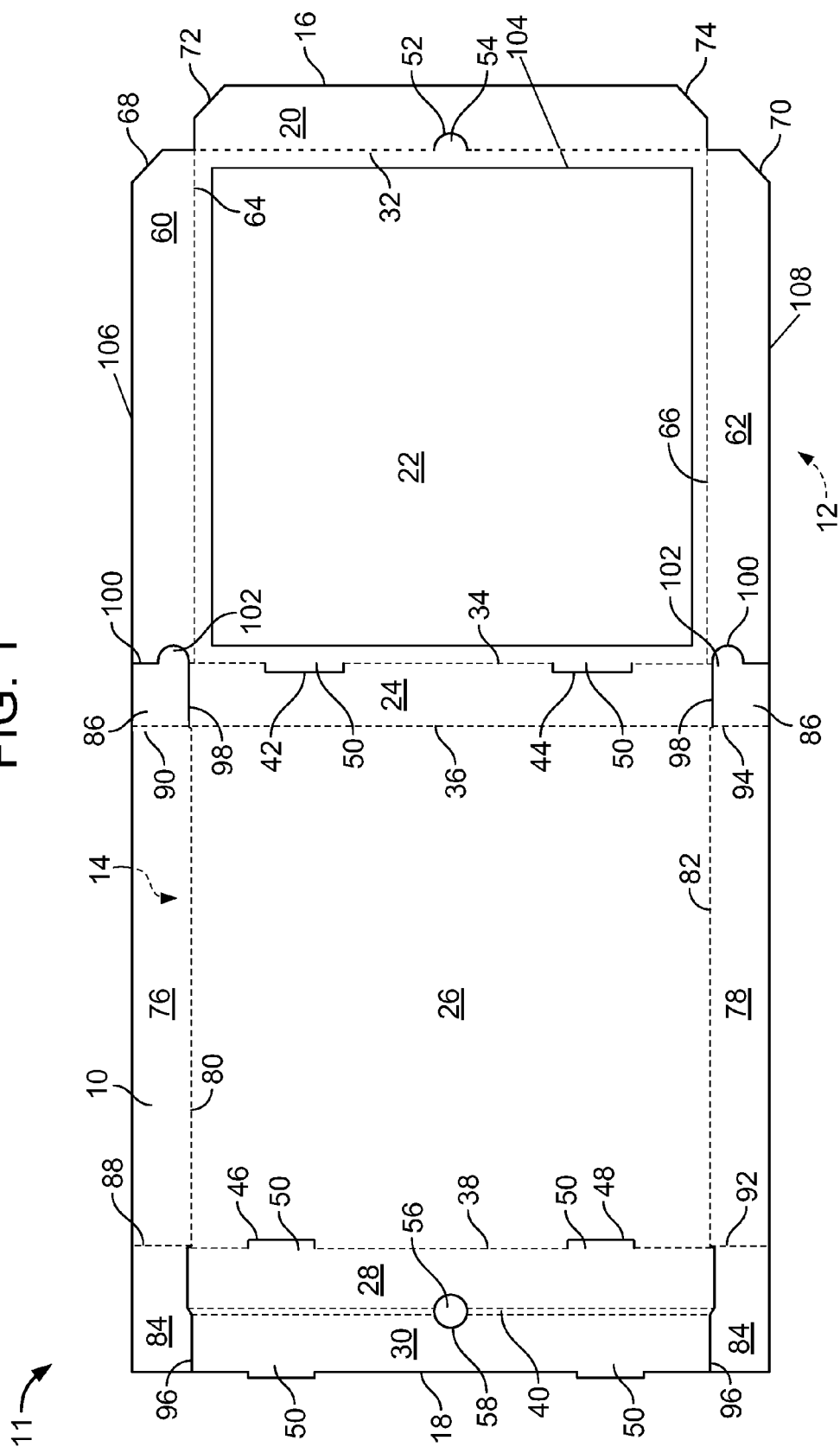
FIGS. 1-17 show exemplary embodiments of the system and method described herein.

The following detailed description illustrates the disclosure by way of example and not by way of limitation. The description clearly enables one skilled in the art to make and use the disclosure, describes several embodiments, adaptations, variations, alternative, and use of the disclosure, including what is presently believed to be the best mode of carrying out the disclosure.

The present invention provides a heat-reflective container that includes a heat-reflective film, such as a thermal film, and a method for constructing a heat-reflective blank. The heat-reflective blank is at least partially constructed using a machine. In one embodiment, the blank is fabricated from a corrugate material. The blank, however, may be fabricated using any suitable material, and therefore is not limited to a specific type of material. In alternative embodiments, the blank is fabricated using cardboard, plastic, fiberboard, paperboard, foamboard, corrugated paper, and/or any suitable material known to those skilled in the art and guided by the teachings herein provided. The heat-reflective blank described herein may or may not include a cutout over which the thermal film is applied.

For purposes of this disclosure, the container referred to herein is a container formed from a blank of sheet material and the heat-reflective film attached to the blank of sheet material. The blank referred to herein is the blank of sheet material; while the heat-reflective blank referred to herein is the blank of sheet material with the heat-reflective film coupled to the blank prior to the heat-reflective blank being formed into the container.

In an example embodiment, the heat-reflective container and/or a heat-reflective film includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. In another embodiment, the container is void of markings, such as, without limitation, indicia that communicates the product, a manufacturer of the product and/or a seller of the product. Furthermore, the container may have any suitable size, shape and/or configuration, i.e., any suitable number of sides having any suitable size, shape and/or configuration as described and/or illustrated herein. In one embodiment, the container includes a shape that provides functionality, such as a shape that facilitates packaging a food item, a shape that facilitates transporting the container, and/or a shape that facilitates stacking and/or arrangement of a plurality of containers.

In the example embodiment, the blank and/or container includes a heat-reflective, or thermal, film applied to an interior surface of the blank. When the container is formed from the heat-reflective blank, the heat-reflective film is positioned adjacent a product within the container to facilitate maintaining a temperature of the product and/or prolonging a cooling period of the product. In one embodiment, the product is a heated pizza, and the heat-reflective film reflects the heat emitted from the pizza back towards the pizza such that the cooling of the pizza is delayed. More specifically, the heat-reflective film reflects heat from an upper surface of the pizza back onto the pizza to maintain the temperature of the pizza for a longer time as compared to conventional pizza containers. Further, the heat-reflective film is coupled to the blank using a machine that cuts the heat-reflective film and applies the heat-reflective film to the interior surface of the blank. The machine can also stack the heat-reflective blanks. The machine enables more heat-reflective blanks to be formed in a shorter period of time as compared to manually cutting and gluing the heat-reflective film to the blanks.

Figure 2:
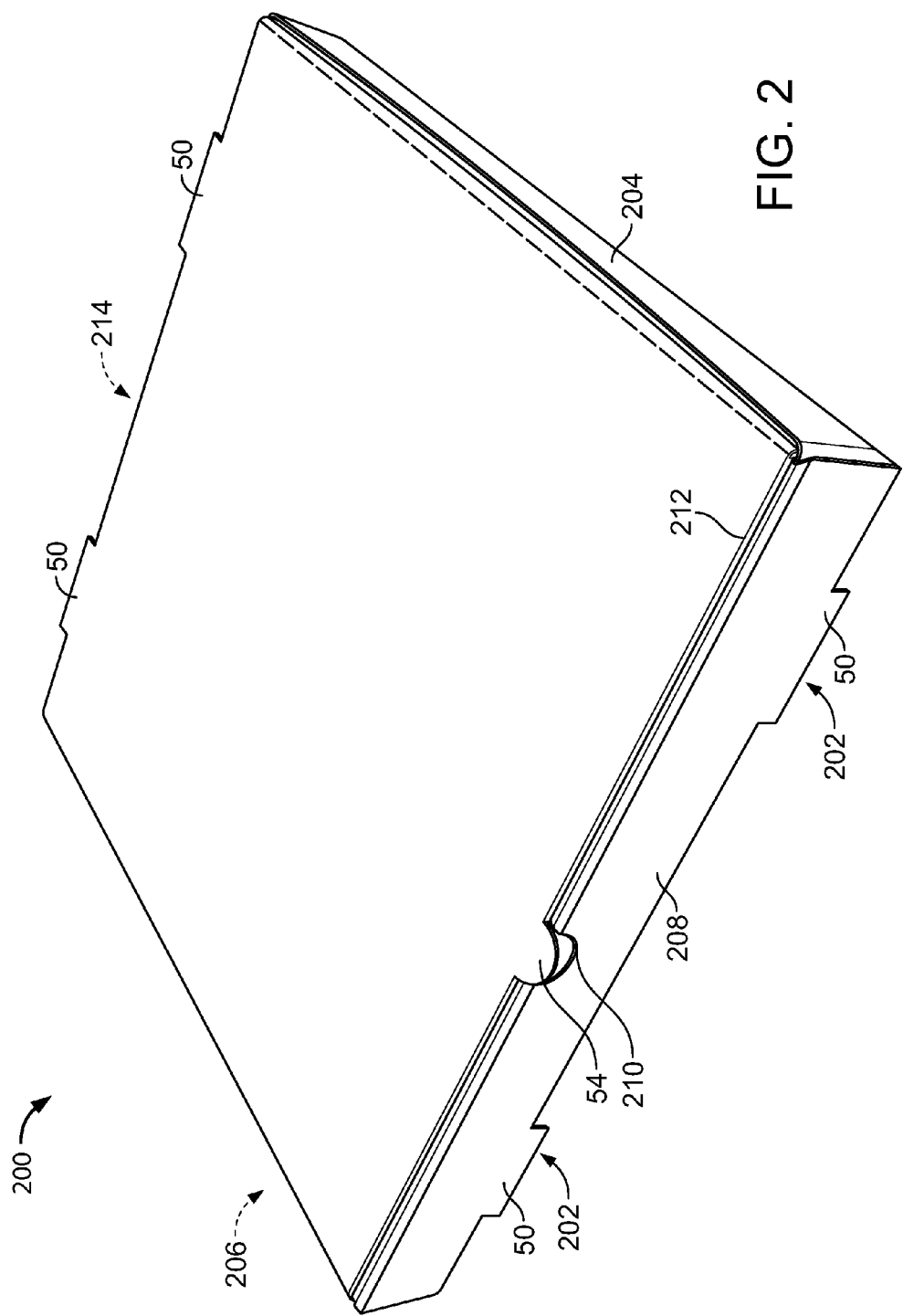

Referring now to the drawings, and more specifically to FIGS. 1 and 2, although as described above a container may have any suitable size, shape, and/or configuration, FIGS. 1 and 2 illustrate the construction or formation of one embodiment of a container from a blank of sheet material and a heat-reflective film (also referred to as a thermal film). Specifically, FIG. 1 is a top plan view of one embodiment of a heat-reflective blank 11 of sheet material that includes a blank 10 and a thermal film 104 attached to blank 10. FIG. 2 is a perspective view of one embodiment of a container 200 formed from heat-reflective blank 11 shown in FIG. 1. Blank 10 is formed from a corrugate material in the exemplary embodiment.

Referring to FIG. 1, blank 10 has a first or interior surface 12 and an opposing second or exterior surface 14. Further, blank 10 defines a leading edge 16 and an opposing trailing edge 18. In one embodiment, blank 10 includes, from leading edge 16 to trailing edge 18, a tuck flap 20, a top panel 22, a back panel 24, a bottom panel 26, a outer front panel 28, and a inner front panel 30 coupled together along preformed, generally parallel, fold lines 32, 34, 36, and 38, and hinge line 40, respectively. More specifically, tuck flap 20 extends from top panel 22 along fold line 32, back panel 24 extends from top panel 22 along fold line 34, bottom panel 26 extends from back panel 24 along fold line 36, outer front panel 28 extends from bottom panel 26 along fold line 38, and inner front panel 30 extends from outer front panel 28 along hinge line 40. Fold lines 32, 34, 36, and 38, and hinge line 40, as well as other fold lines and/or hinge lines described herein, may include any suitable line of weakening and/or line of separation known to those skilled in the art and guided by the teachings herein provided.

In the exemplary embodiment, fold line 34 and 38 include cut lines 42 and 44, and 46 and 48, respectively. More specifically cut lines 42, 44, 46, and 48 define tab portions 50. When heat-reflective blank 11 is assembled to construct container 200 (shown in FIG. 2), tab portions 50 extend from each of top panel 22 and bottom panel 26 and define openings 202 (shown in FIG. 2) extending through container 200. Although cut lines 42 and 44 and tabs 50 are shown and described as extending from fold line 34 and/or top panel 22, fold line 34 and/or top panel 22 is not required to include cut lines 42 and 44 and tabs 50. Trailing edge 18 also includes defined tab portions 50 extending therefrom. In the exemplary embodiment, fold line 32 includes a cut line 52 that defines a semi-circular tab 54. Although tab 54 is shown and described as being semi-circular, tab 54 may be any other suitable shape that enables blank 10 and/or container 200 to function as described herein, or blank 10 may include fold line 32 having no cut line 52 and/or tab 54. Furthermore, in the exemplary embodiment, hinge line 40 includes a cut-out portion 56 defined by a cut line 58. Although cut-out portion 56 is shown as substantially circular, cut-out portion 56 may be any shape, such as but not limited to being, square, rectangular, oblong, irregular, and/or any other shape that enables heat-reflective blank 11 and/or container 200 to function as described herein. In one embodiment, hinge line 40 is substantially continuous and does not include cut-out portion 56 and/or cut line 58.

Top panel 22 includes a first top side panel 60 and a second top side panel 62 extending therefrom along respective fold lines 64 and 66. More specifically, first top side panel 60 extends from top panel 22 along fold line 64, and second top side panel 62 extends from top panel 22 along fold line 66. In the exemplary embodiment, first top side panel 60, second top side panel 62, and tuck flap 20 include respective angled edges 68, 70, 72, and 74. Although each side panel 60 and 62, and tuck flap 20 include respective angled edges 68, 70, 72, and 74, some or none of side panels 60 and 62 and tuck flap 20 may include angled edges 68, 70, 72, and 74.

Bottom panel 26 includes a first bottom side panel 76 and a second bottom side panel 78 extending therefrom along respective fold lines 80 and 82. More specifically, first bottom side panel 76 extends from bottom panel 26 along fold line 80, and second bottom side panel 78 extends from bottom panel 26 along fold line 82. Furthermore, each bottom side panel 76 and 78 includes a front tab 84 and a back tab 86 extending from respective fold lines 88, 90, 92, and 94. More specifically, one front tab 84 extends from first bottom side panel 76 along fold line 88, one back tab 86 extends from first bottom side panel 76 along fold line 90, one front tab 84 extends from second bottom side panel 78 along fold line 92, and one back tab 86 extends from second bottom side panel 78 along fold line 94. Each front tab 84 is separated from outer front panel 28 and inner front panel 30 by a cut line 96. Each back tab 86 is separated from back panel 24 by a cut line 98, and further separated from respective top side panels 60 and 62 by a cut line 100. Although, in the exemplary embodiment, cut lines 100 define an extension portion 102, cut lines 100 may be any suitable shape, size, and/or configuration that enables heat-reflective blank 11 and/or container 200 to function as described herein.

In the exemplary embodiment, blank 10 has a heat-reflective film or a thermal film 104 coupled thereto on interior surface 12 for forming heat-reflective blank 11. Heat-reflective blank 11 is used to form container 200. Thermal film 104 may be glued, tacked, taped, stapled, and/or otherwise affixed to blank 10 using a machine, as described in more detail below. In the exemplary embodiment, thermal film 104 is coupled to interior surface 12 of top panel 22 and substantially covers top panel 22. Alternatively, thermal film 104 is coupled to interior surface 12 of any suitable panel(s). Further, in the exemplary embodiment, thermal film 104 is for example, but not limited to, aluminum foil (with or without a protective coating), metalized polymer films (such as oriented polypropylene, polyethylene terephthalate, nylon, polyethylene, cast polypropylene, polyester, and/or polyvinyl chloride), metalized paper, and/or non-metalized polymer films.

To construct container 200 shown in FIG. 2 from heat-reflective blank 11 shown in FIG. 1, bottom side panels 76 and 78 are rotated about respective fold lines 80 and 82 toward interior surface 12 to form a generally right angle with bottom panel 26. Each bottom side panel 76 and 78 forms a respective bottom side wall 204 and 206. Front tabs 84 are each rotated about respective fold lines 88 and 92 toward interior surface 12 of each bottom side panel 76 and 78 to form a generally right angle with each bottom side panel 76 and 78. Outer front panel 28 is rotated about fold line 38 toward interior surface 12 to form a generally right angle with bottom panel 26. Exterior surface 14 of each front tab 84 is adjacent to interior surface 12 of outer front panel 28. Inner front panel 30 is rotated about hinge line 40 such that interior surface 12 of each front tab 84 is adjacent to interior surface 12 of inner front panel 30. As such, when inner front panel 30 is rotated about hinge line 40, front tabs 84 extend between inner front panel 30 and outer front panel 28. In the exemplary embodiment, tabs 50 extending from inner front panel 30 interconnect with openings 202 formed by tabs 50 extending from outer front panel 28 to facilitate securing inner front panel 30 against front tabs 84 and outer front panel 28. Outer front panel 28, inner front panel 30, and front tabs 84 define a bottom front wall 208. When front wall 208 is assembled, cut-out portion 56 defines an indentation 210 within a top edge 212 of front wall 208.

Each back tab 86 is rotated about respective fold lines 90 and 94 toward interior surface 12 to form a generally right angle with each respective bottom side panel 76 and 78. Back panel 24 is rotated about fold line 36 toward interior surface 12 to form a generally right angle with bottom panel 26. In the exemplary embodiment, exterior surface 14 of each back tab 86 is adjacent to interior surface 12 of back panel 24. Back panel 24 and back tabs 86 define a back wall 214. Each top side panel 60 and 62 is rotated about respective fold lines 64 and 66 toward interior surface 12 to form generally right angles with top panel 22. Each top side panel 60 and 62 define a top side wall (not shown). Tuck flap 20 is rotated about fold line 32 toward interior surface 12 to form a generally right angle with top panel 22. When tuck flap 20 is folded about fold line 32, tab 54 extends from top panel 22. To close container 200, top panel 22 is rotated about fold line 34 toward interior surface 12 to be aligned substantially parallel to bottom panel 26. When top panel 22 is rotated into place, exterior surface 14 of each top side panel 60 and 62 is adjacent to interior surface 12 of respective bottom side panels 76 and 78. Further, when top panel 22 is rotated into place, exterior surface 14 of tuck flap 20 is adjacent to exterior surface 14 of inner front panel 30. Once container 200 is constructed, container 200 may hold any suitable item or items, for example, but not limited to, a food item, such as, a pizza, and thermal film 104 is positioned adjacent the item, such as adjacent to a top surface of the item.

Figure 3:
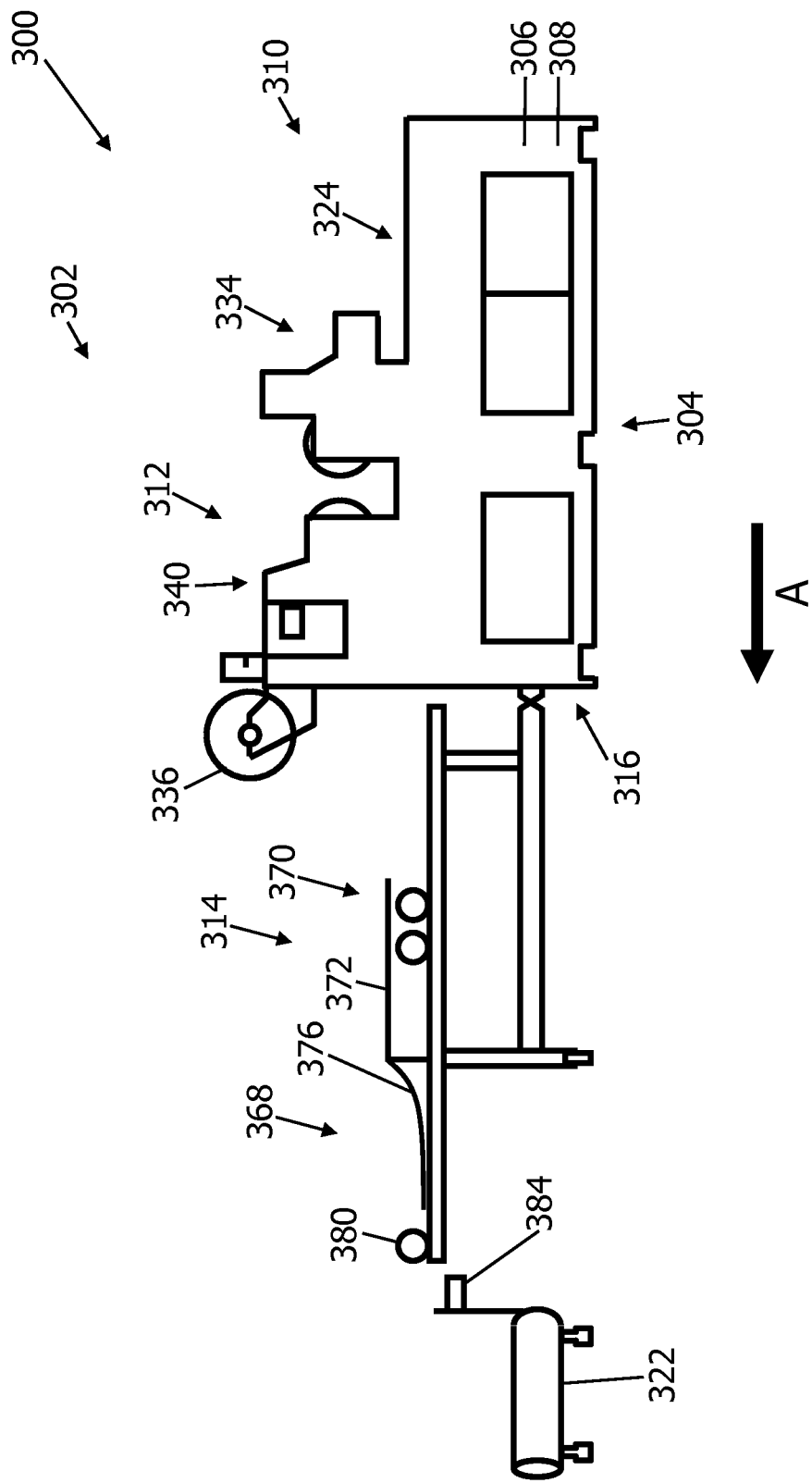
Figure 4:
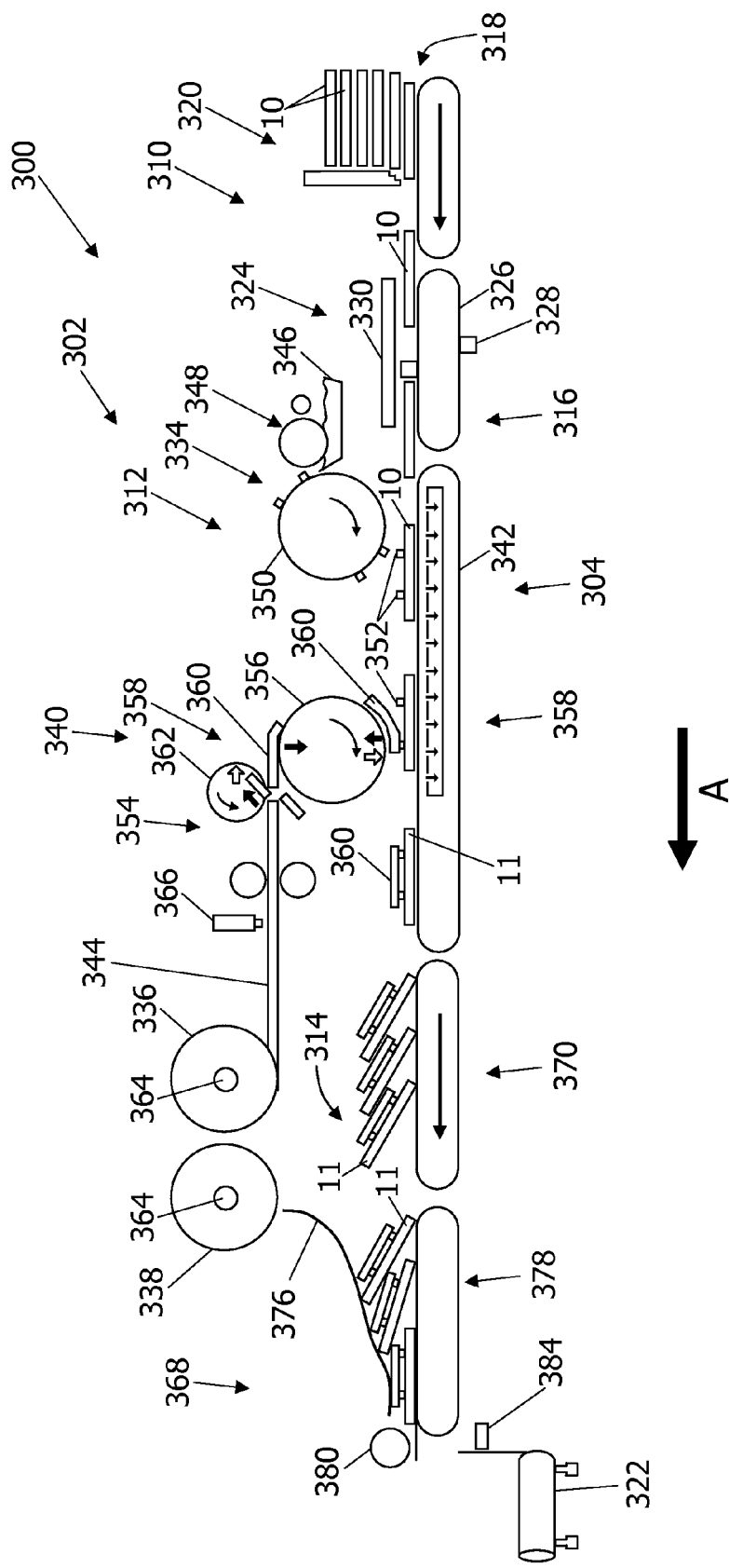

FIG. 3 is a side view of a machine 300 for forming heat-reflective blank 11 (shown in FIG. 1). FIG. 4 is a schematic side view of machine 300. As used herein, the terms "downward," "down," and variations thereof refer to a direction from a top 302 of machine 300 toward a surface or floor 304 on which machine 300 is supported, and the terms "upward," "up," and variations thereof refer to a direction from floor 304 on which machine 300 is supported toward top 302 of machine 300. Further, as used herein, "operational control communication" refers to a link, such as a conductor, a wire, and/or a data link, between two or more components of machine 300 that enables signals, electric currents, and/or commands to be communicated between the two or more components. The link is configured to enable one component to control an operation of another component of machine 300 using the communicated signals, electric currents, and/or commands.

In the exemplary embodiment, components of stations 310, 312, and/or 314 (described in more detail below) are in communication with a control system 306. Control system 306 is configured to control and/or monitor components of machine 300 to form heat-reflective blank 11. In the exemplary embodiment, control system 306 includes computer-readable instructions for performing the methods described herein. In one embodiment, an operator can select a type of blank being manipulated by machine 300 using control system 306, and control system 306 performs the corresponding method using the components of machine 300. Control system 306 is shown as being centralized within machine 300, however control system 306 may be a distributed system throughout machine 300, within a building housing machine 300, and/or at a remote control center. Control system 306 includes a processor 308 configured to perform the methods and/or steps described herein. Further, many of the other components described herein include a processor. As used herein, the term "processor" is not limited to integrated circuits referred to in the art as a processor, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor, and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, machine control commands. The execution of sequences of instructions is not limited to any specific combination of hardware circuitry and software instructions.

In FIGS. 3-17, arrow A shows a direction of movement of blank 10 and/or heat-reflective blank 11 through machine 300. Further, the head of arrow A indicates a "downstream" or "forward" direction and the tail of arrow A indicates an "upstream" or "backward" direction. The term "front" as used herein with respect to movement through machine 300 refers to the downstream end of blank 10 and/or heat-reflective blank 11, and the term "rear" as used herein with respect to movement through machine 300 refers to the upstream end of blank 10 and/or heat-reflective blank 11.

Referring to FIGS. 3 and 4, in the exemplary embodiment, machine 300 includes an intake station 310, an applicator station 312, and an ejection station 314. More specifically, intake station 310, applicator station 312, and ejection station 314 are connected by a transport system 316, such as any suitable conveyor(s) and/or motorized device(s) configured to move blank 10 and/or heat-reflective blank 11 through machine 300. In the exemplary embodiment, intake station 310 is configured to store a stack 318 of blanks 10 in a substantially horizontal orientation and/or receive blanks 10 from an upstream machine and/or process. In an embodiment including a hopper 320, blanks 10 are stored with interior surface 12 facing upwards. Alternatively, blanks 10 are fed, interior surface 12 upwards, from an upstream machine that forms blanks 10 from sheet material. In the exemplary embodiment, applicator station 312 is generally aligned with and downstream of intake station 310 and includes any suitable number and/or configuration of components, such as rollers, actuators, pumps, and/or other devices for applying thermal film 104 to blank 10. In the exemplary embodiment, ejection station 314 is configured to eject heat-reflective blanks 11 from machine 300. More specifically, in the exemplary embodiment, ejection station 314 includes at least an exit conveyor 322. Exit conveyor 322 is a component of transport system 316.

During operation of machine 300 to form heat-reflective blanks 11 from blanks 10, blanks 10 are received within intake station 310. Transport system 316 feeds blanks 10 from intake station 310 into applicator station 312. Within applicator station 312, thermal film 104 is applied to interior surface 12 of blank 10 to form heat-reflective blank 11. Heat-reflective blanks 11 are ejected from machine 300 at ejection station 314. A subsequent blank 10 is transferred from intake station 310 into applicator station 312 such that heat-reflective blanks 11 are formed continuously by machine 300.

Figure 5:
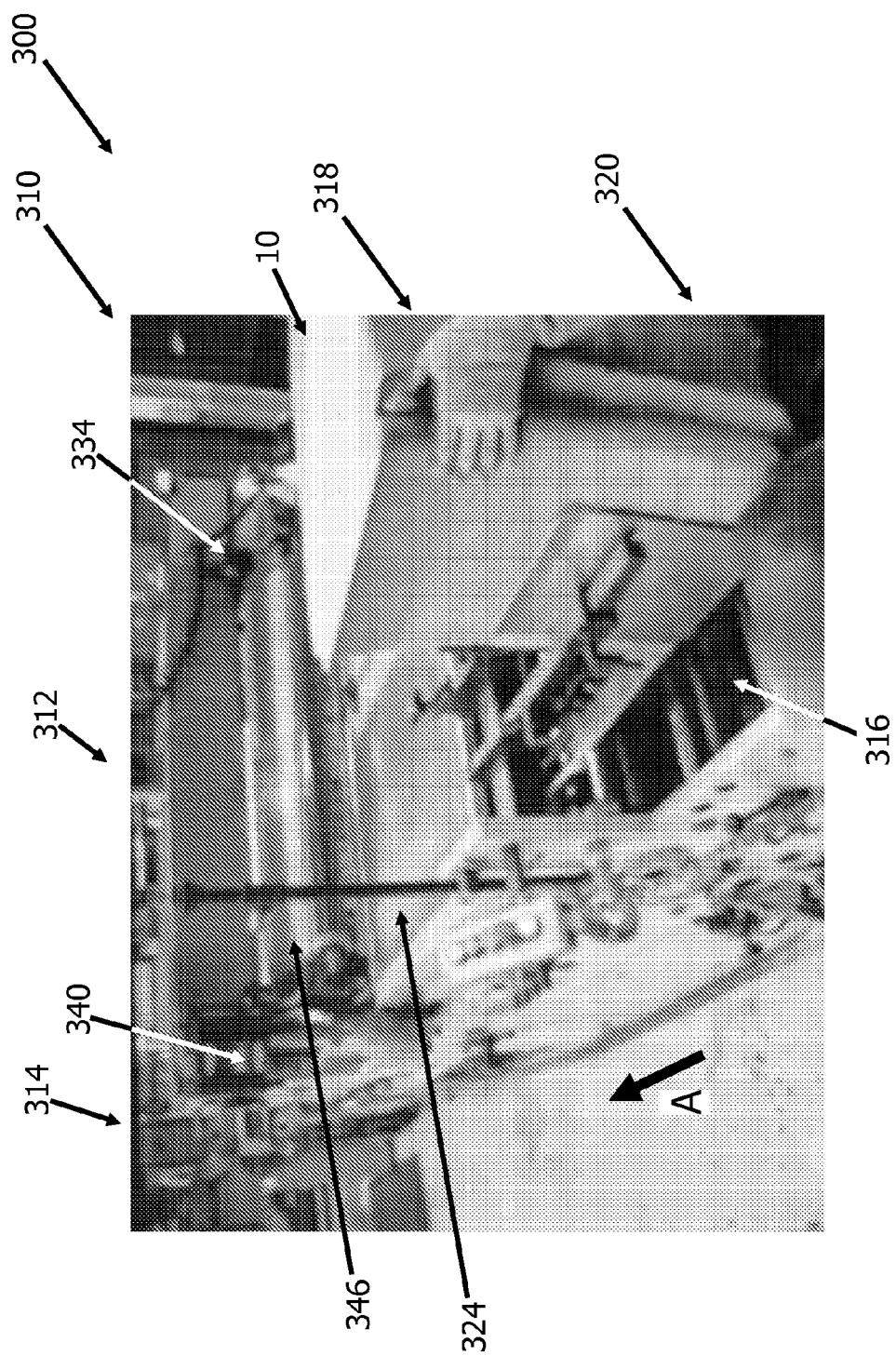
Figure 6:
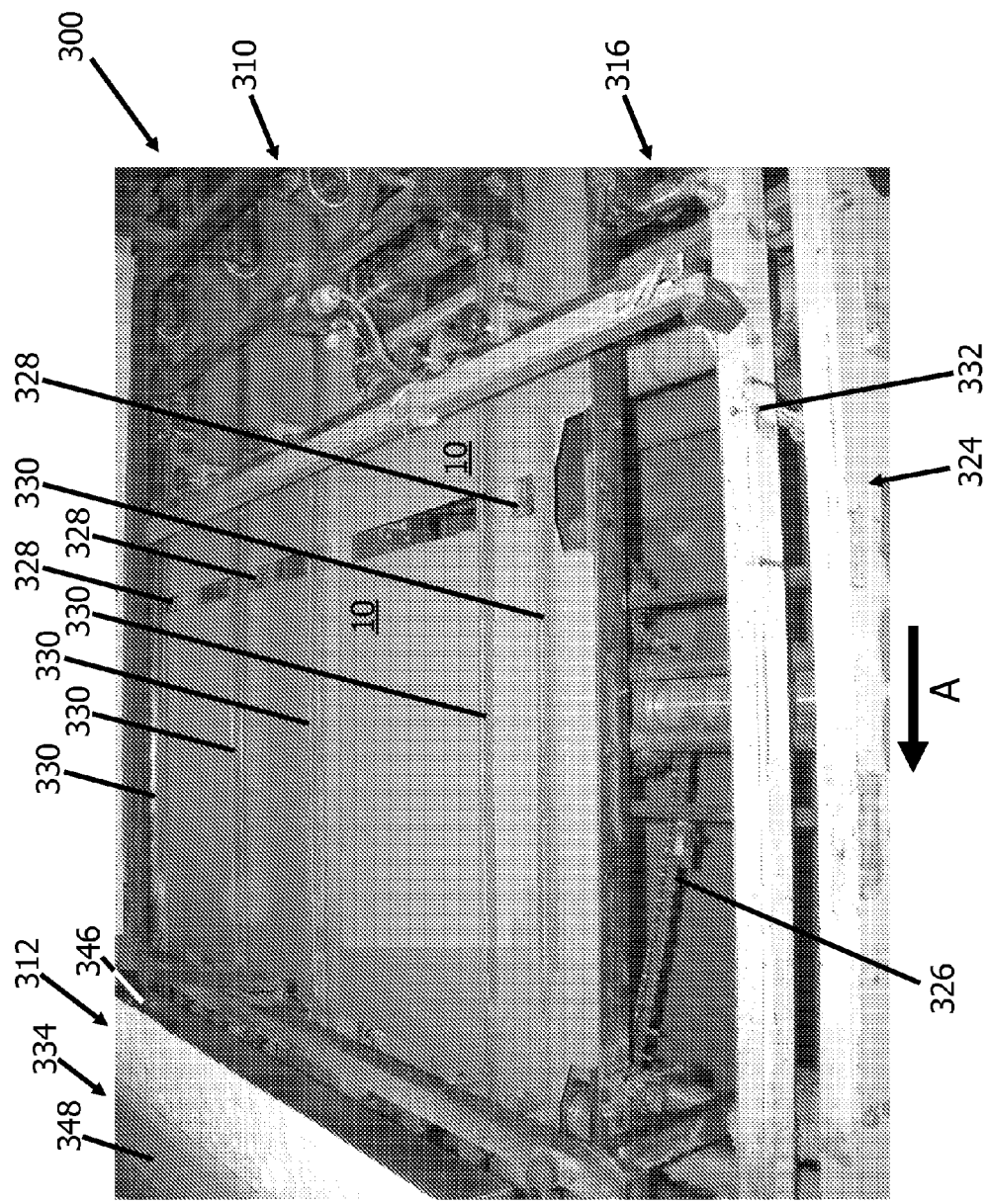

FIG. 5 is a perspective view of intake station 310 that may be used with machine 300 (shown in FIGS. 3 and 4). FIG. 6 is a perspective view of a separator 324 that may be used with intake station 310. Referring to FIGS. 4-6, intake station 310 includes hopper 320 and separator 324. In the exemplary embodiment, stack 318 of blanks 10 are stored horizontally within hopper 320; however, hopper 320 can be omitted and blanks 10 can be fed to separator 324 from an upstream machine. In the exemplary embodiment, transport system 316 is configured to remove a blank 10 from a bottom of stack 318 and transport blank 10 to separator 324. Separator 324 is configured to provide predetermined spacing between blanks 10 being fed into applicator station 312 such that thermal film 104 is applied properly. Further, separator 324 aligns blanks 10 properly for feeding into applicator station 312.

Separator 324 includes a feed chain 326 with lugs 328 extending therefrom. Lugs 328 are spaced apart along chain 326. Feed chain 326 and lugs 328 may be collectively referred to as a "spacing conveyor." Feed chain 326 and lugs 328 are configured to space blanks 10 apart for proper film application and/or to align blanks 10 properly for transport into applicator station 312. In one embodiment, lug spacing is dependent on a size of blank 10 and, in an alternative embodiment, lugs 328 are at a predetermined spacing and a size of blank 10 is entered into control system 306. Chain 326 is considered to be a component of transport system 316. Exterior surface 14 of blanks 10 is adjacent chain 326, and lug 328 contacts a trailing side edge 106 or 108 (shown in FIG. 1). Separator 324 can include any number of chains 326 with lugs 328 that maintains a spacing and/or alignment of blanks 10 while blanks 10 are fed to applicator station 312. Further, in one embodiment, separator 324 includes support rails positioned adjacent to and/or in contact with exterior surface 14 of blank 10 to support blanks 10 within separator 324.

In the exemplary embodiment, separator 324 further includes adjustable hold-down bars 330. More specifically, hold-down bars 330 are adjacent to and/or in direct contact with interior surface 12 of blank 10. Separator 324 can include any suitable number of hold-down bars 330, and, in particular embodiments, the number of hold-down bars 330 is selected based on the type of material used to form blank 10 and/or a size of blank 10. In the exemplary embodiment, hold-down bars 330 are oriented substantially parallel to an upstream/downstream direction of machine 300 and are adjustable horizontally and vertically with respect to a frame 332 of separator 324 and/or machine 300. For example, hold-down bars 330 can be positioned nearer to each other or farther from each other depending on a material of blank 10. Further, hold-down bars 330 can be raised or lowered depending on a thickness of blank 10 or depending on an amount of variation in the planarness of blank 10 (also sometimes referred to as the warpage of blank 10). In other words, depending upon the thickness of blank 10 and/or the amount of warpage of blank 10, hold-down bars 330 can be adjusted in a vertical direction to facilitate transport of blank 10 through separator 324. The adjustment of hold-down bars 330 in a vertical direction as referred to herein is described as an adjustment in a height of hold-down bar 330, wherein "height" means a distance between hold-down bar 330 and chain 326. In the exemplary embodiment, the height of hold-down bars 330 is selected to enable chain 326 to move blanks 10 toward applicator station 312 while still retaining blanks 10 against chain 326 and/or lugs 328 to maintain the spacing and/or alignment of blanks 10 within separator 324. In one embodiment, each hold-down bar 330 is separately adjustable using any suitable levers, arms, screws, and/or other devices. By being separately adjustable, warped blanks can be better transported through machine 300. Alternatively, at least a subset of hold-down bars 330 is adjustable as a unit using any suitable levers, arms, screws, and/or other devices. When separator 324 includes the support rails, the support rails can oppose a force applied to blanks 10 by hold-down bars 330.

Figure 7:
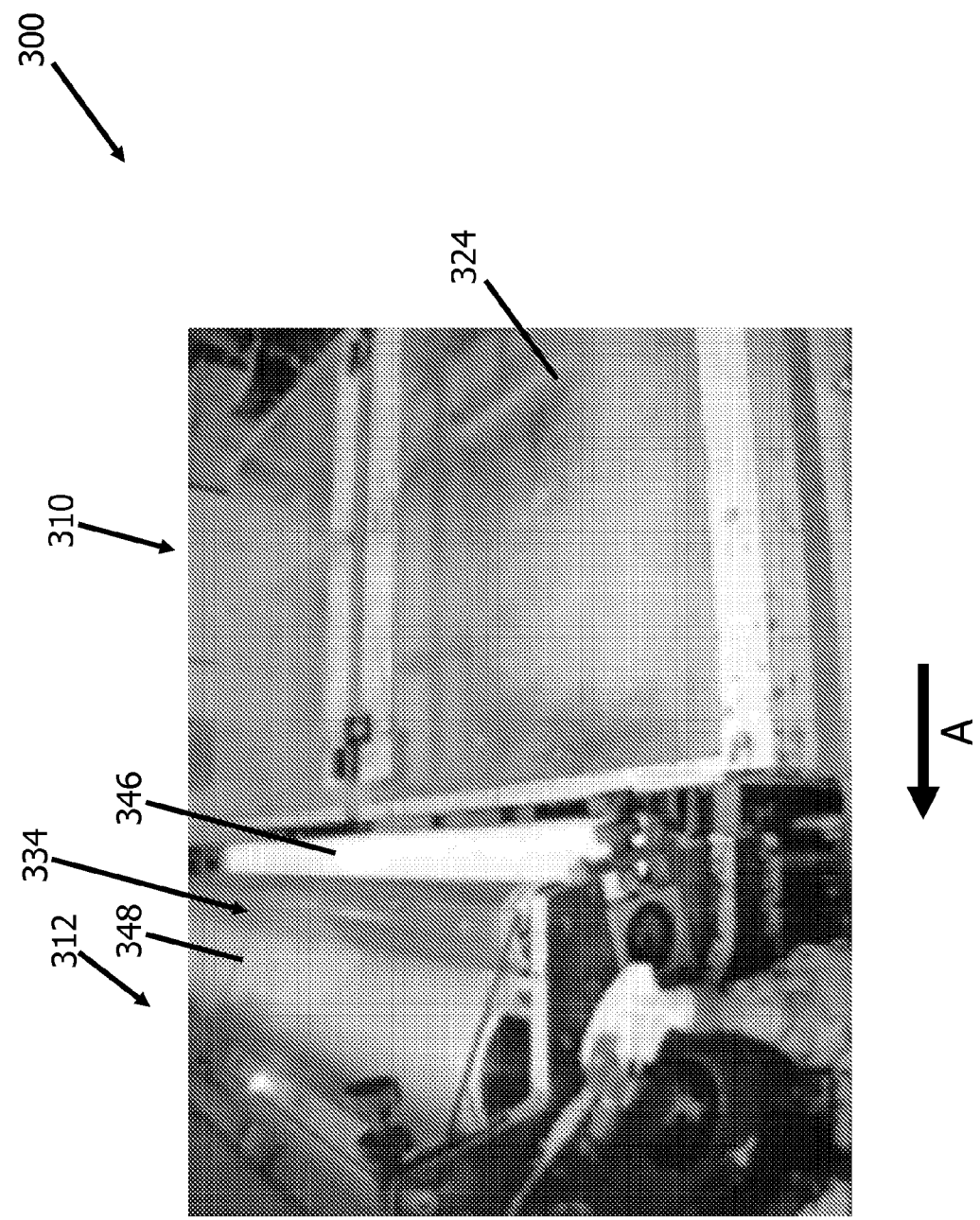
Figure 8:
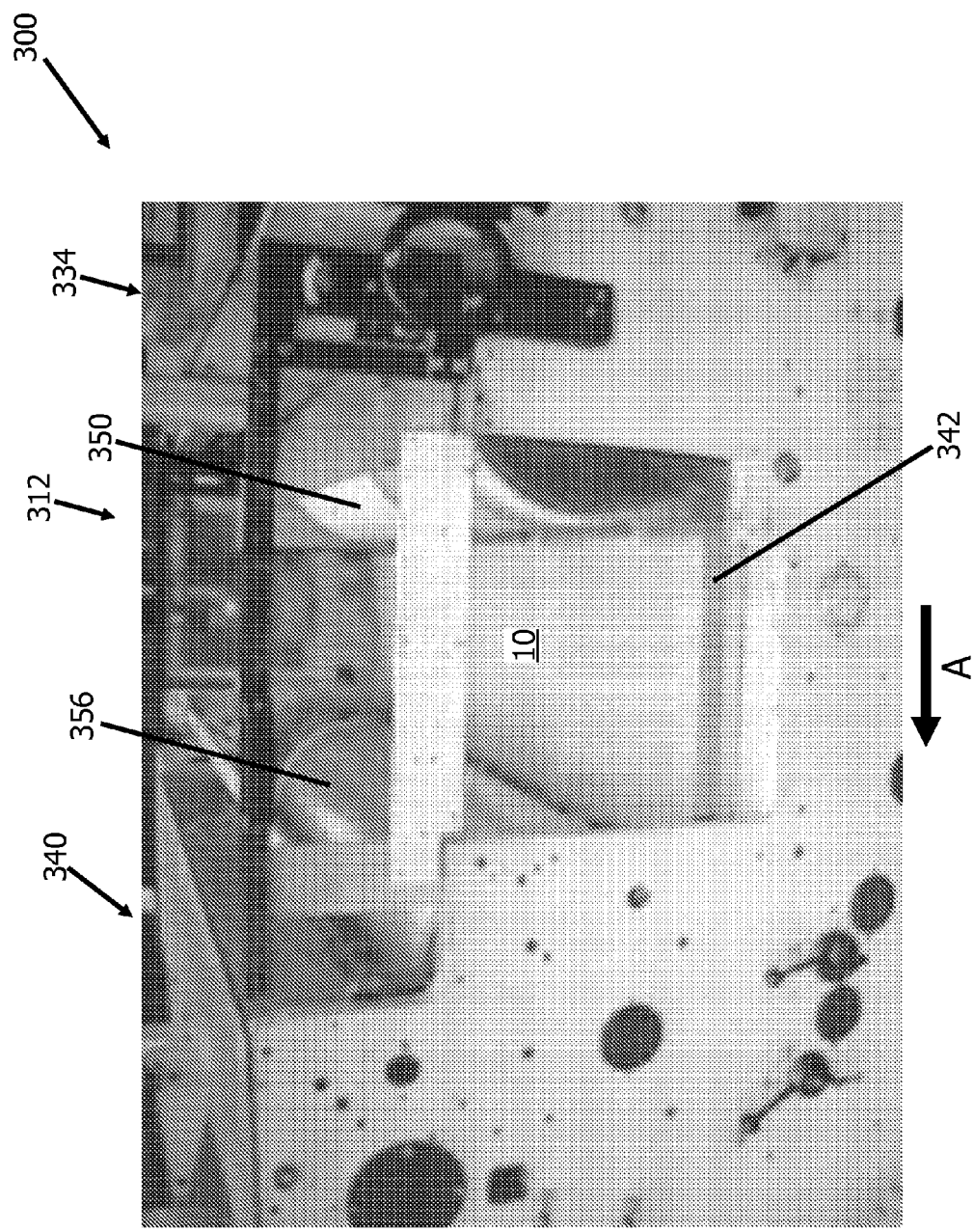
Figure 9:
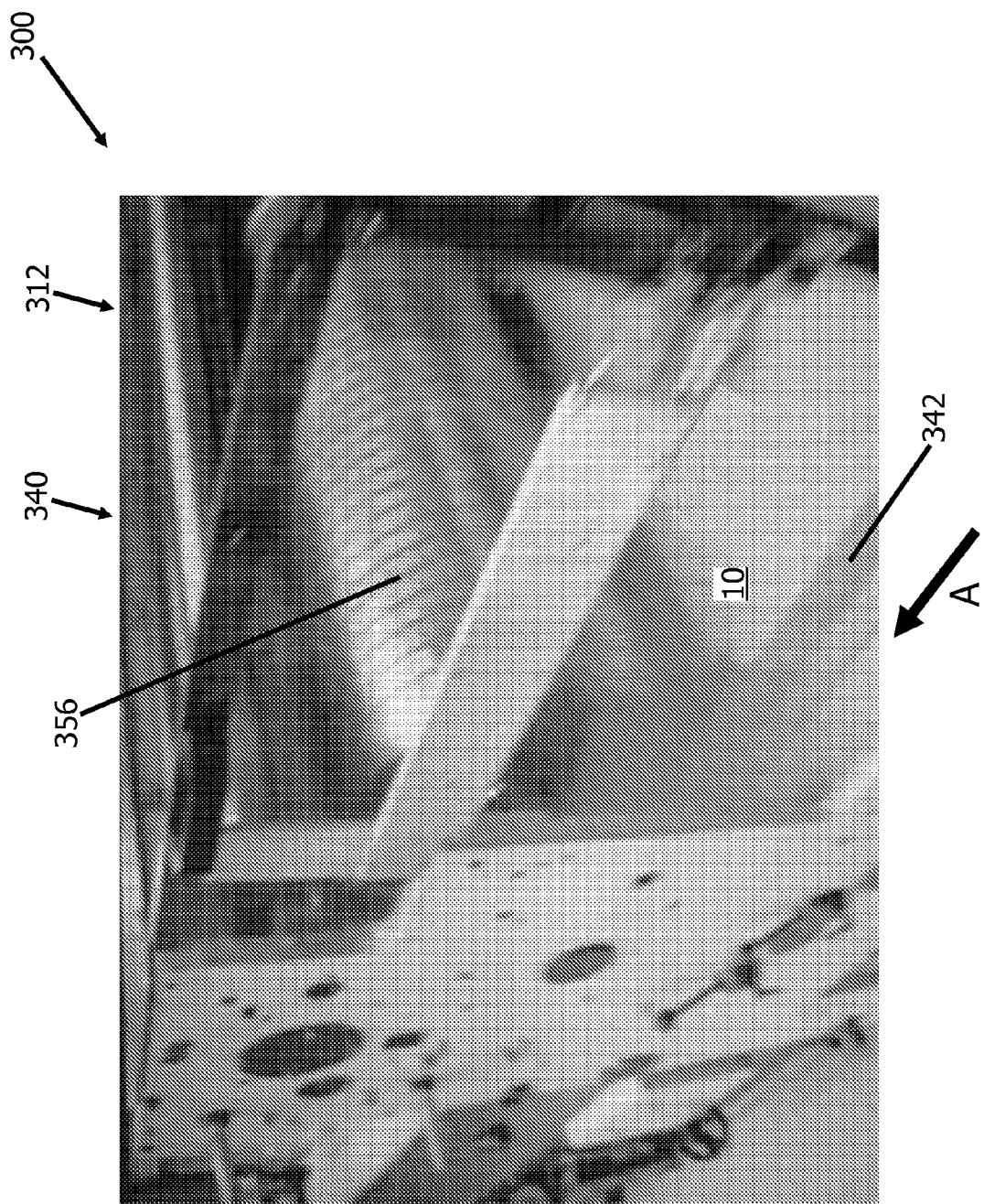
Figure 10:
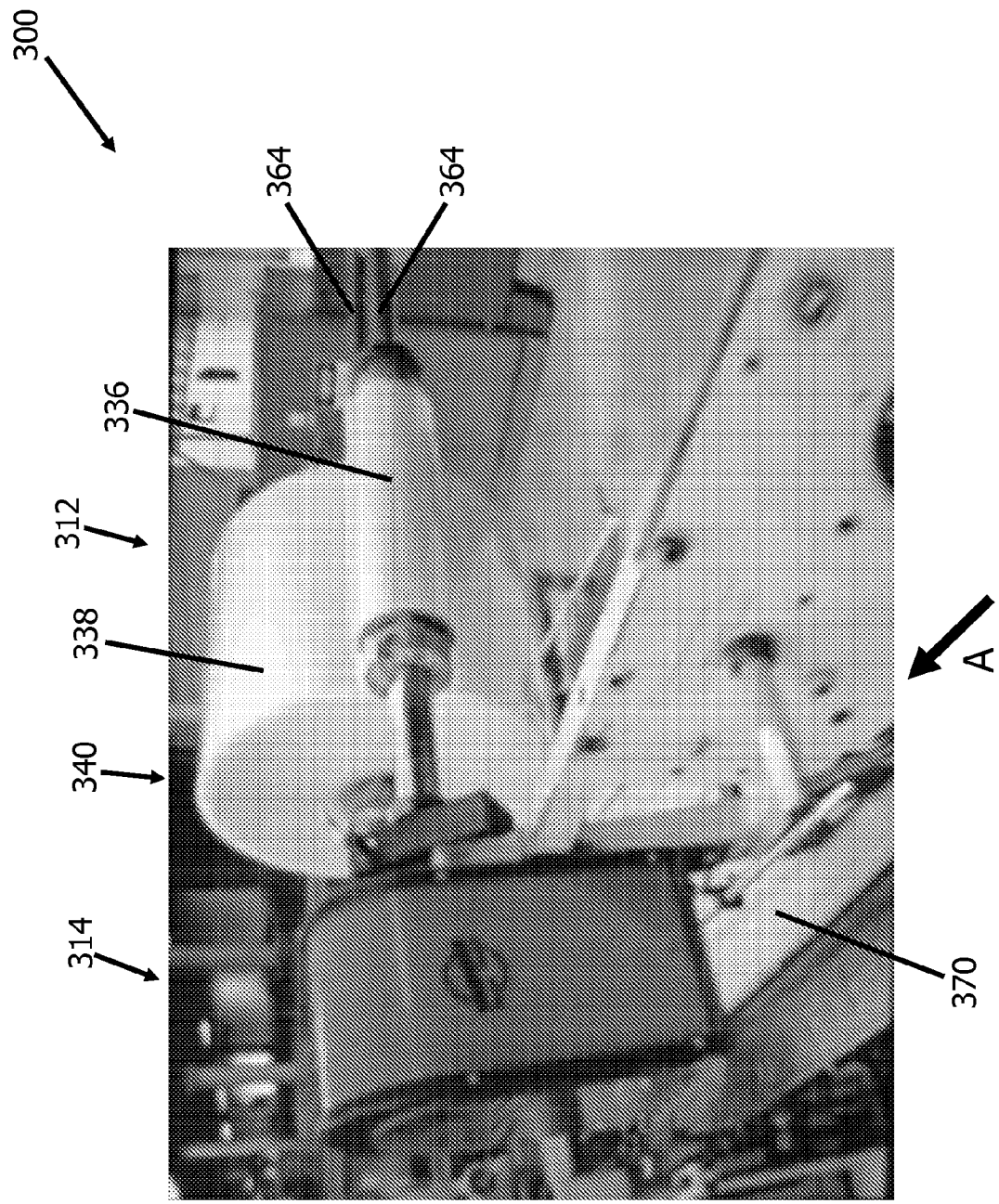
Figure 11:
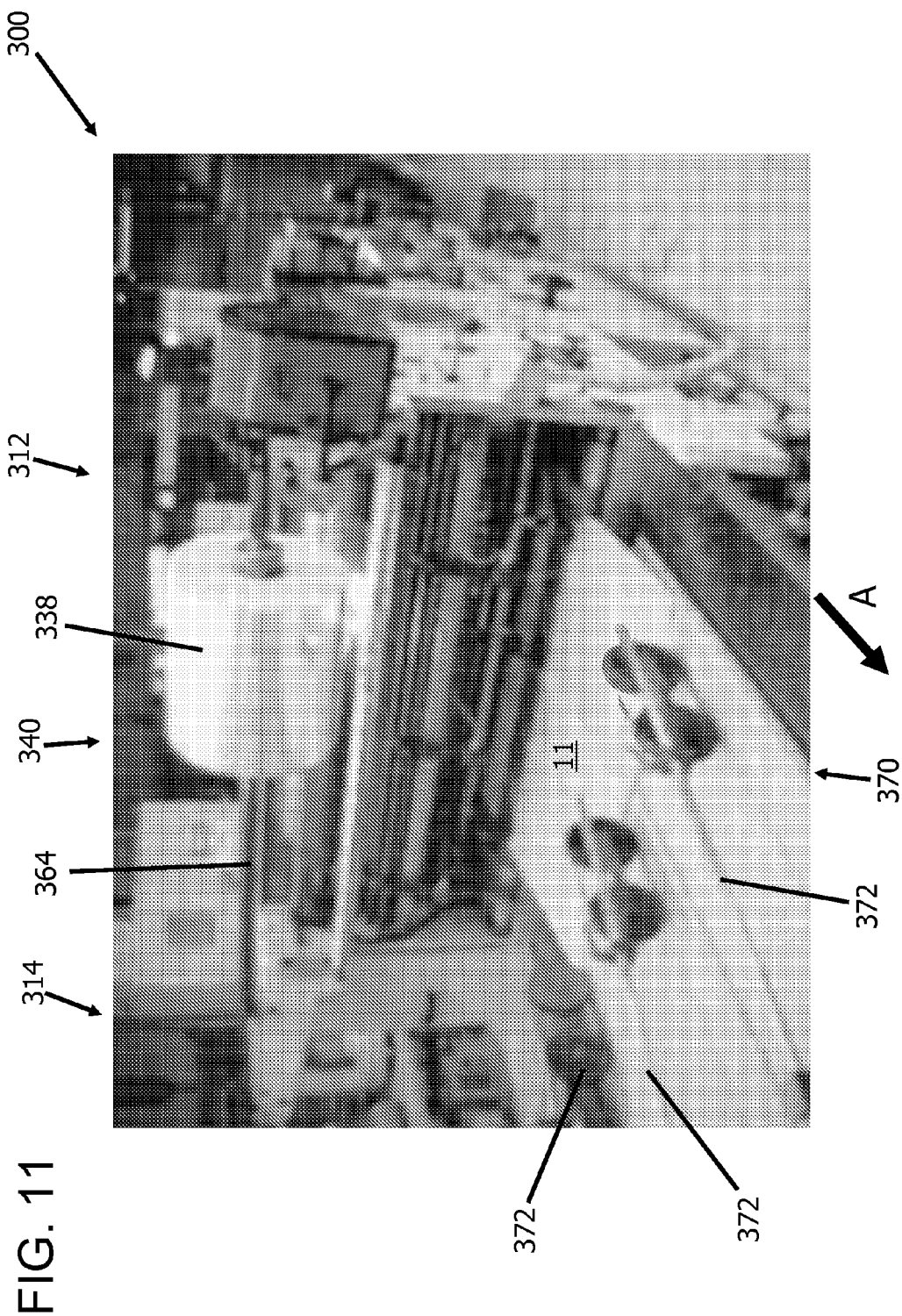

FIG. 7 is a perspective view of a glue applicator 334 that can be used with machine 300 (shown in FIGS. 3 and 4). FIG. 8 is a side perspective view of applicator station 312. FIG. 9 is a rear perspective view of applicator station 312. FIG. 10 is a perspective view of film rolls 336 and 338 that may be used with applicator station 312. FIG. 11 is a front perspective view of applicator station 312. Referring to FIGS. 4 and 6-11, applicator station 312 includes glue applicator 334 and a film applicator 340. A conveyor 342 extends from intake station 310 through applicator station 312. Conveyor 342 can be any suitable device for moving blanks 10 and/or 11 through applicator station 312 and is a component of transport system 316. In the exemplary embodiment, film roll 336 and/or 338 is a roll of thermal film 104 (shown in FIG. 1). Further, the continuous film 344 from film roll 336 and/or 338 may be referred to herein as a "film web" or "web."

Glue applicator 334 includes a glue well 346, a glue transfer device 348, and a glue stencil 350. Glue well 346 stores glue, and glue transfer device 348 removes the glue from glue well 346 and applies the glue to glue stencil 350. Glue stencil 350 is configured to apply a predetermined glue pattern to interior surface 12 of blank 10. In the exemplary embodiment, glue stencil 350 is a roller that applies glue 352 to blank 10 as blank 10 is moved past glue stencil 350. The glue pattern is applied to interior surface 12 of top panel 22. The glue pattern corresponds with a shape of a film patch 360 being applied to interior surface 12 of top panel 22. Film patch 360 is also configured to maximize the reflection of heat from the contents of container 200. For example, film patch 360 can be square, rectangular, circular, and/or any suitable shape that enables maximum reflection of heat from a pizza to onto the pizza. In one embodiment, when the pizza is substantially square, film patch 360 is substantially square and, when the pizza is substantially circular, film patch 360 is substantially circular.

In the exemplary embodiment, film applicator 340 includes film roll 336 and/or 338, a cutting device 354, a film sheet roller 356, and an air distribution system 358. Cutting device 354 is configured to cut a predetermined size sheet or patch 360 of film 344 from film roll 336. Film sheet roller 356 is configured to apply film sheet or patch 360 to blank 10 and press film patch 360 to glue 352 on blank 10. In the exemplary embodiment, air distribution system 358 is distributed through cutting device 354, film sheet roller 356, and/or conveyor 342. Control system 306 can control portions of air distribution system 358 independently. For example, air distribution system 358 in cutting device 354 and film roller 356 can be operated while air distribution system 358 in conveyor 342 can be turned off.

In the exemplary embodiment, film web 344 from film roll 336 is fed past cutting device 354 and around film sheet roller 356. Air distribution system 358 vacuums film 344 to a roller 362 of cutting device 354 until film 344 has been cut to a predetermined size to form patch 360. After film 344 is cut, air distribution system 358 blows cut film sheet or patch 360 on to film sheet roller 356 in, for example, a "handshake" transfer between cutting device roller 362 and film sheet roller 356. Air distribution system 358 vacuums film patch 360 on to film sheet roller 356 and film sheet 360 is moved downward toward blank 10. As film patch 360 contacts the glue 352 on blank 10, air distribution system 358 blows film patch 360 from film sheet roller 356 on to blank 10. Film sheet roller 356 further forces film patch 360 on to glue 352 by applying pressure to interior surface 12 of blank 10 to form heat-reflective blank 11. Film patch 360 becomes thermal barrier 104 of heat-reflective blank 11.

Air distribution system 358 within conveyor 342 vacuums a blank 10 to conveyor 342 to maintain blank 10 in a substantially planar configuration when, for example, the blank is formed from a relatively thin material, such as paperboard. When blank 10 is formed from a relatively thick material, such as corrugate, air distribution system 358 within conveyor 342 is not operated because the relatively thick material is maintained in a substantially planar configuration on its own. In the exemplary embodiment, applicator station 312 includes main film roll 336 and a backup film roll 338 each supported by a solid shaft 364. More specifically, solid shaft 364 is of a sufficient strength for supporting a roll of metallic film. Further, applicator station 312 can include an optical eye 366 positioned between film roll 336 and cutting device 354 and configured to facilitate formation of film sheets 360 from continuous film 344 fed from film roll 336.

Figure 12:
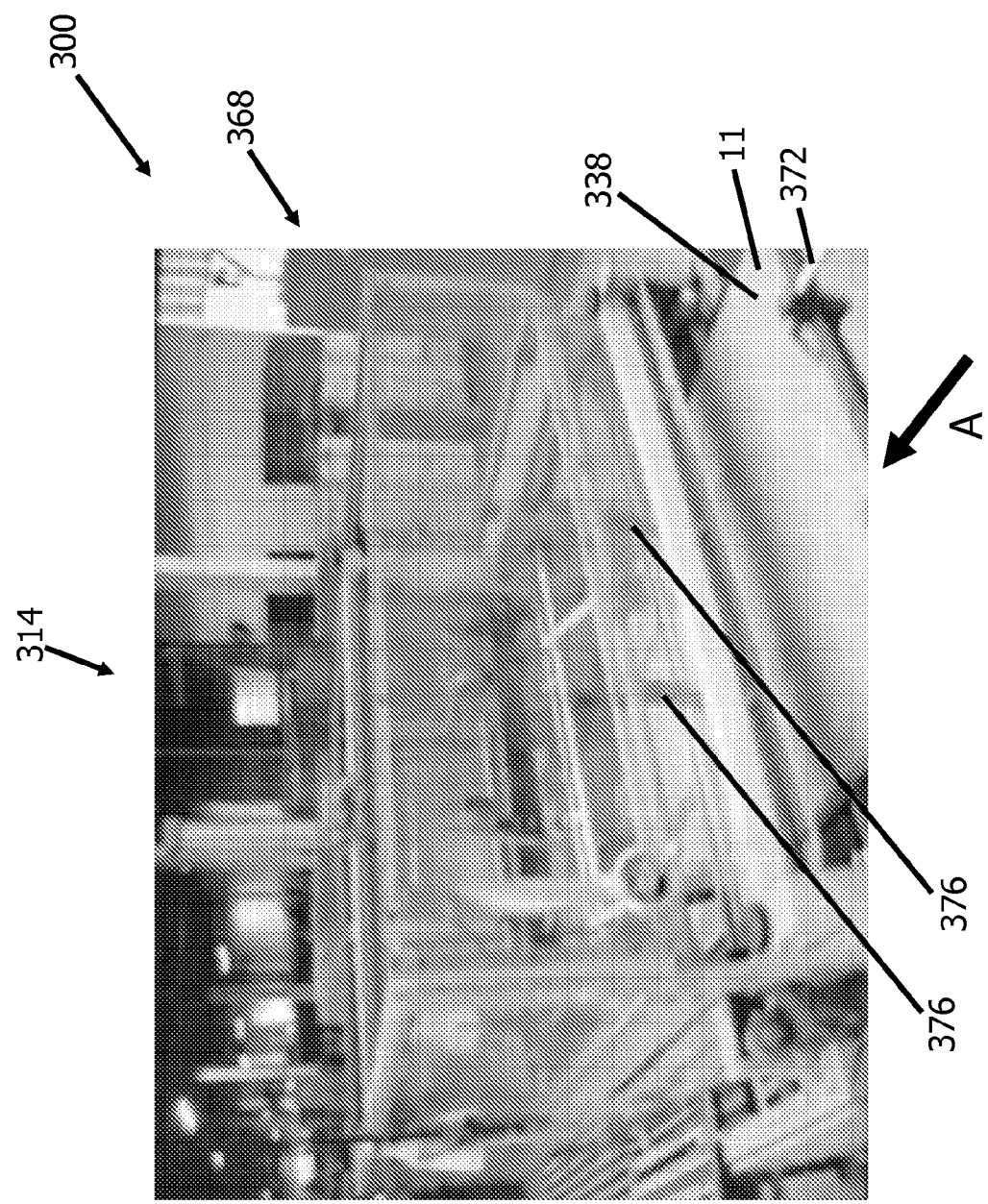
Figure 13:
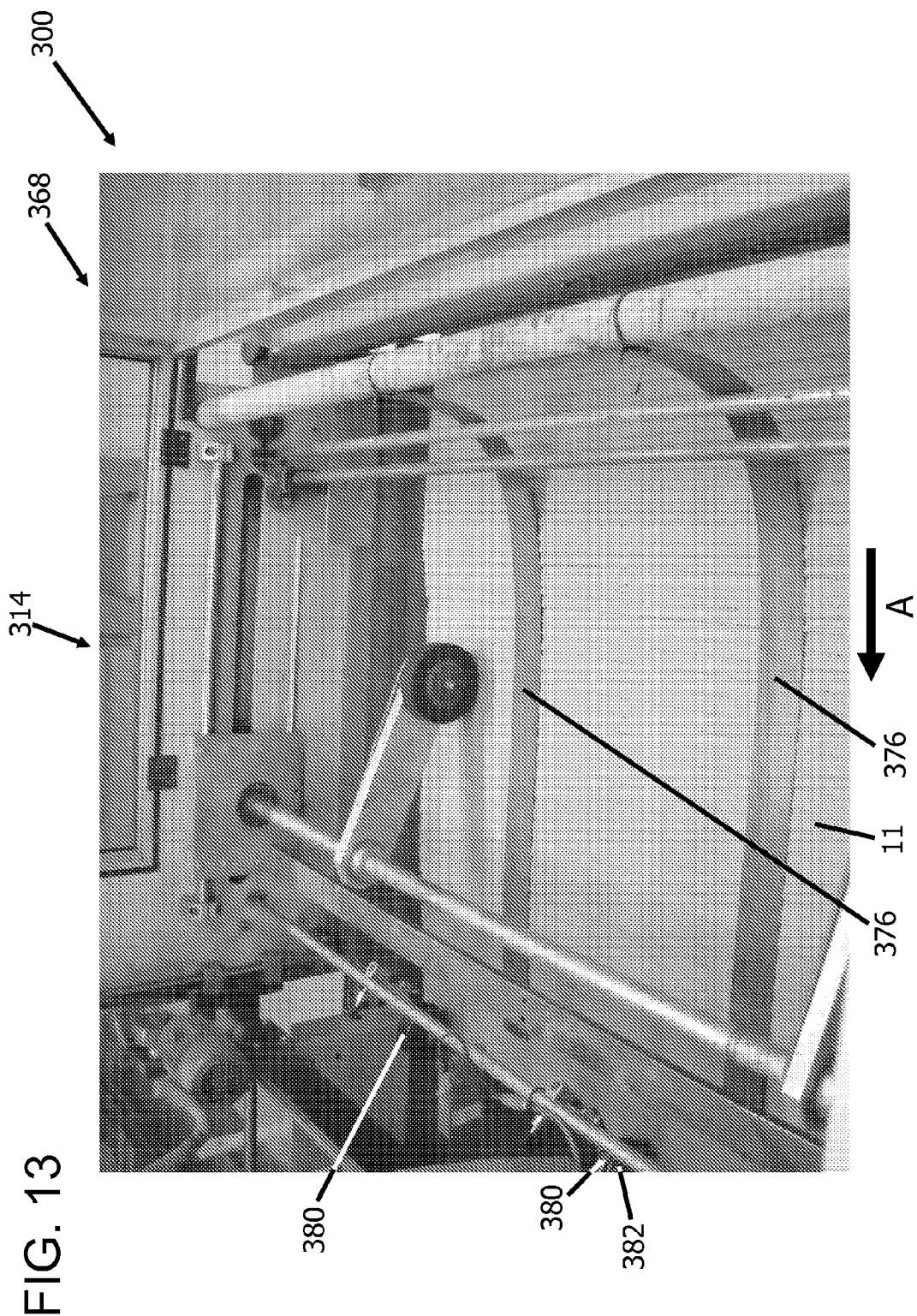
Figure 14:
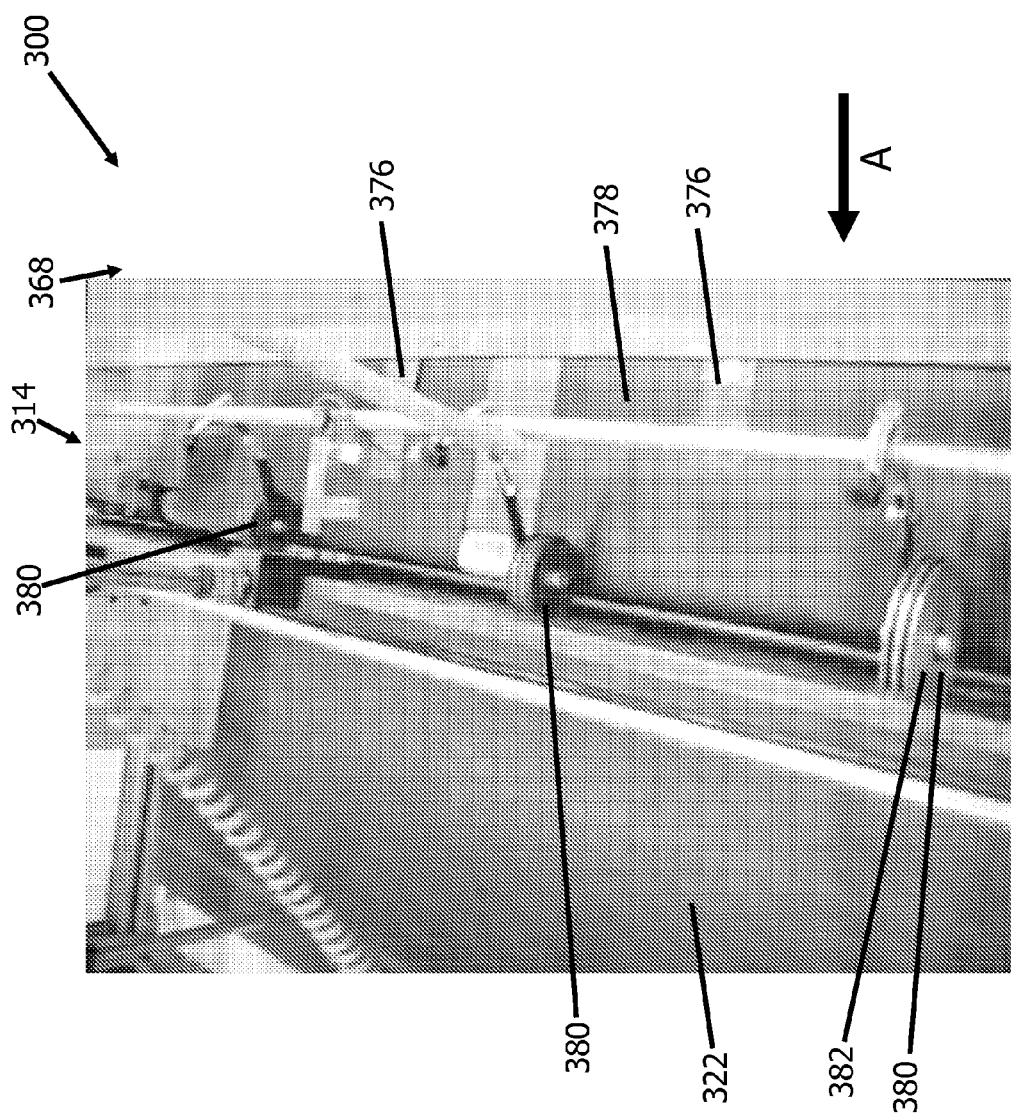
Figure 15:
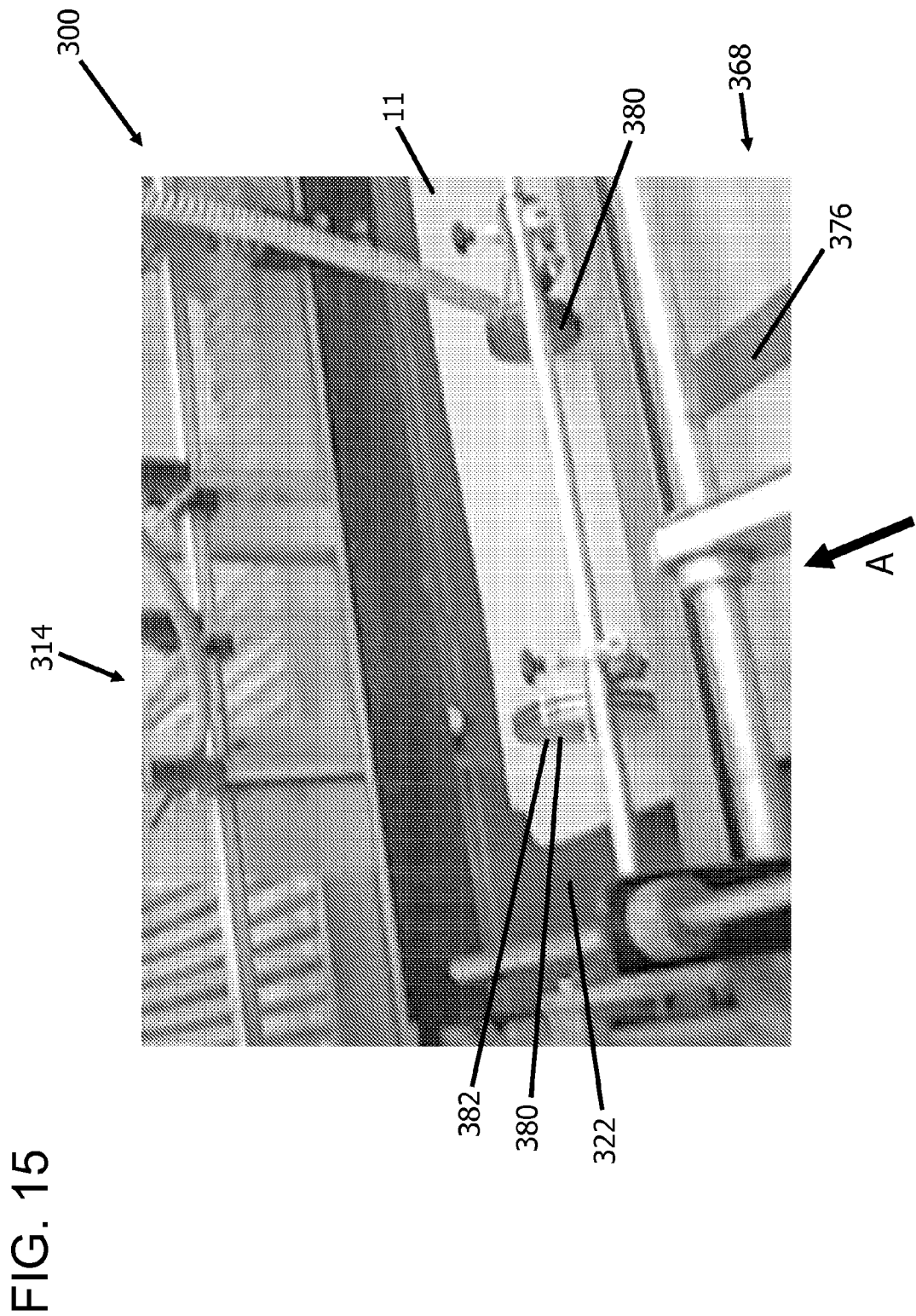
Figure 16:
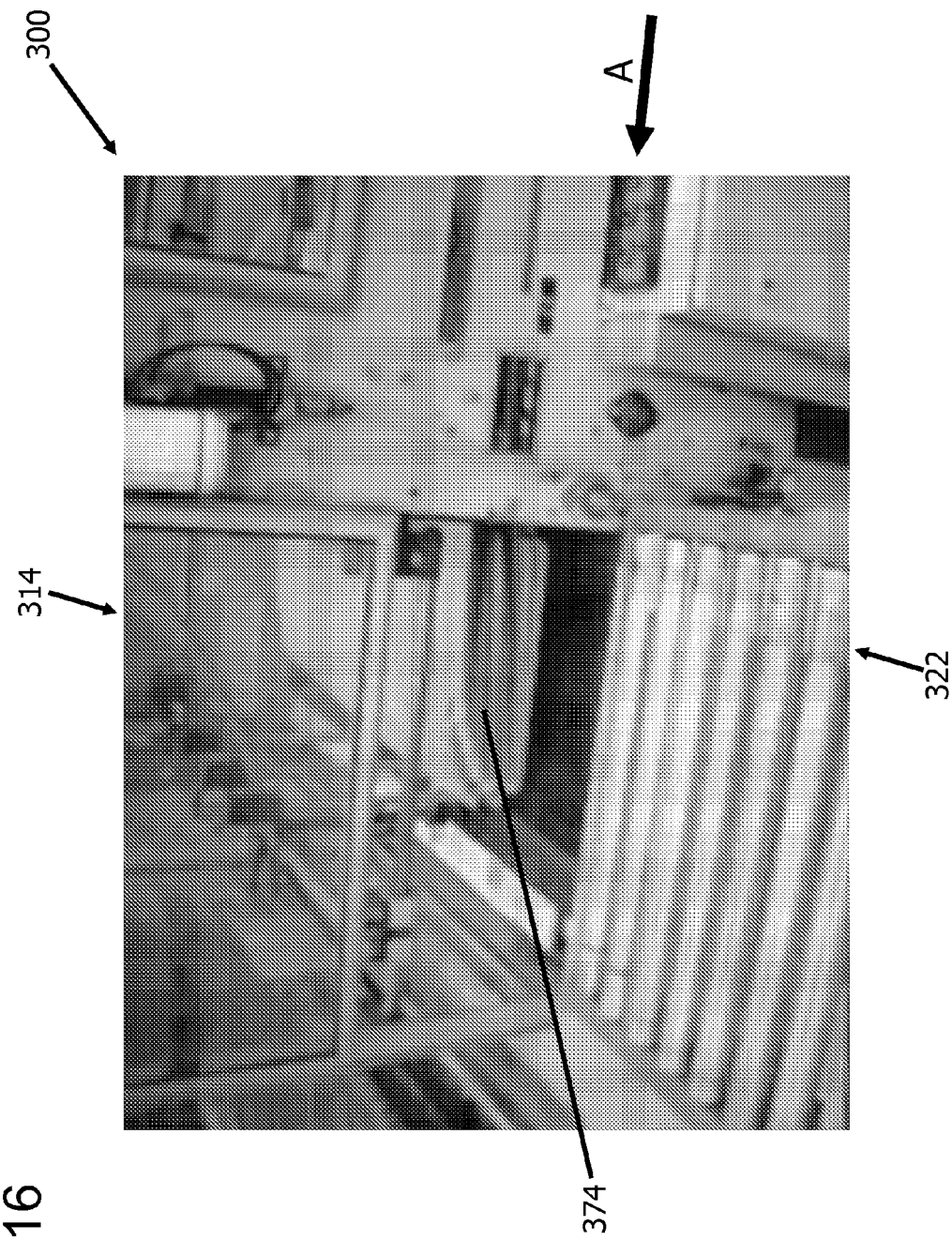

FIG. 12 is a rear perspective view of ejection station 314 that may be used with machine 300 (shown in FIGS. 3 and 4). FIG. 13 is a side perspective view of an accumulator 368 that may be used with ejection station 314. FIG. 14 is a side perspective view of ejection station 314. FIG. 15 is a perspective view of ejection station 314. FIG. 16 is a side perspective view of exit conveyor 322 that may be used with ejection station 314. In the exemplary embodiment, ejection station 314 includes a stacking table 370, accumulator 368, and exit conveyor 322. Alternatively, ejection station 314 does not include accumulator 368 and/or stacking table 370 such that heat-reflective blanks 11 are ejected from applicator station 312 onto exit conveyor 322.

In the exemplary embodiment, stacking table 370 is positioned at an end of conveyor 342, and configured to allow glue to set up. More specifically, heat-reflective blanks 11 are shingled onto stacking table 370 from conveyor 342. As used to herein, the term "shingling" refers to a stacking of blanks where a subsequent blank is positioned partially over a previous blank such that a leading edge of each blank is exposed and a trailing edge of each blank is under a subsequent blank. The addition of heat-reflective blanks 11 to stacking table 370 pushes previous heat-reflective blanks 11 along stacking table 370. Roller arms 372 facilitate shingling heat-reflective blanks 11 on stacking table 370.

Accumulator 368 is positioned downstream from stacking table 370 and receives shingled heat-reflective blanks 11 from stacking table 370. Accumulator 368 is configured to accumulate a predetermined number of heat-reflective blanks 11, and eject the predetermined number of heat-reflective blanks 11 as a stack 374. More specifically, in the exemplary embodiment, accumulator 368 includes spring bars 376, an ejector 378, and hold-down rollers 380. Spring bars 376 are coupled at an upstream end of accumulator 368 and extend downstream across interior surfaces 12 of heat-reflective blanks 11. Spring bars 376 are configured to maintain the shingling of heat-reflective blanks 11 as heat-reflective blanks 11 are counted by accumulator 368. For example, spring bars 376 apply a force to heat-reflective blanks 11 that is sufficient to prevent corrugated heat-reflective blanks 11 from jamming within accumulator 368. In the exemplary embodiment, spring bars 376 are each formed from a flexible steel material that is configured to apply a predetermined force to heat-reflective blanks 11. Spring bars 376 extend downstream and apply the force over several of the shingled heat-reflective blanks to facilitate the counting, transporting and stacking of the heat-reflective blanks.

Hold-down rollers 380 are configured to maintain the shingling of heat-reflective blanks 11 as heat-reflective blanks 11 are ejected onto exit conveyor 322. More specifically, in the exemplary embodiment, accumulator 368 includes a plurality of hold-down rollers 380 spaced across a width of the shingled heat-reflective blanks 11. At least one hold-down roller 382 is a stainless steel roller that is sufficiently weighted to prevent the corrugated blanks 10 from jamming within accumulator 368. For example, at least one hold-down roller 382 is weighted such that it weighs substantially more than the other rollers. This more heavily weighted roller may also have a diameter that is larger than the diameter of the other rollers. This more heavily weighted roller applies a predetermined force to heat-reflective blanks 11 which facilitates preventing the heat-reflective blanks 11 from jamming within accumulator 368. In the exemplary embodiment, hold-down roller 382 is configured to maintain the shingling of heat-reflective blanks 11 as heat-reflective blanks 11 are ejected from accumulator 368 such that blanks 11 properly stack on exit conveyor 322. If, for example, hold-down roller 382 does not have sufficient weight, or is too light, blanks 11 will not remain shingled and/or jam in accumulator 368 such that blanks 11 will not properly stack. Conversely, if hold-down roller 382 is too heavy, blanks 11 may be ejected one-at-a-time, or not at all, and blanks 11 will not properly stack.

In the exemplary embodiment, ejector 378 is any suitable device for pushing and/or pulling the predetermined number of heat-reflective blanks 11 from accumulator 368 onto exit conveyor 322. Ejector 378 is selectively activated to push and/or pull heat-reflective blanks 11 from accumulator 368 when the predetermined number of blanks 11 has been reached. Ejector 378 is then positioned to push and/or pull the next predetermined number of blanks 11 from accumulator 368. In the exemplary embodiment, ejector 378 is a conveyor belt, and hold-down rollers 380 assist in removing blanks 11 from accumulator 368 by pushing blanks 11 against the conveyor belt. When ejector 378 is the conveyor belt, the conveyor belt halts after the predetermined number of blanks 11 have been ejected onto exit conveyor 322 to allow a subsequent predetermined number of blanks 11 to accumulate along the conveyor belt. Ejector 378 and/or hold-down rollers 380 are considered to be components of transport system 316.

Exit conveyor 322 receives stack 374 of blanks 11 from accumulator 368 and removes stack 374 from machine 300. In one embodiment, when machine does not include accumulator 368, exit conveyor 322 includes a sensor and/or counter 384 that allows a predetermined number of blanks 11 to be stacked before exit conveyor 322 is activated to remove stack 374 from machine 300. In such an embodiment, exit conveyor 322 is halted to enable a subsequent predetermined number of blanks 11 to be ejected onto exit conveyor 322 to form a subsequent stack 374. In the exemplary embodiment, at least a portion of exit conveyor 322 is vertically moveable to enable stack 374 to be formed on exit conveyor 322. More specifically, as blanks 11 are ejected from accumulator 368, the portion of exit conveyor 322 moves downwardly, and, when the predetermined number of blanks 11 are in stack 374, the portion of exit conveyor 322 moves upwardly to eject stack 374 onto another portion of exit conveyor 322.

Referring to FIGS. 1-16, during operation of machine 300, a predetermined number of hold-down bars 330 in intake station 310 are adjusted vertically and/or horizontally depending on the thickness and/or warpage of the material used to form blanks 10. Blanks 10 are fed into intake station 310 for transport to applicator station 312. More specifically, blanks 10 are fed on to chain 326, under hold-down bars 330, and spaced apart by lugs 328. In the exemplary embodiment, blanks 10 are fed onto chain 326 from stack 318 of blanks 10 in hopper 320. When blanks 10 are in separator 324, hold-down bars 330 push blanks 10 downward against chain 326 to maintain proper spacing of blanks 10. Intake station 310, and particularly separator 324, transports blanks 10 into applicator station 312.

As blanks 10 are transported into applicator station 312, glue applicator 334 applies glue 352 to interior surface 12 of blanks 10 in a predetermined pattern. More specifically, glue stencil 350 applies glue 352 in the predetermined pattern onto blank 10. After glue 352 is applied to blank 10, film patch 360 is applied to blank 10 to form heat-reflective blank 11. More specifically, blank 10 with glue 352 is conveyed under film sheet roller 356, which applies film patch 360 to blank 10 and presses film patch 360 and blank 10 together to secure film patch 360 to glue 352. As described above, film 344 is fed from film roll 336 to cutting device 354 to form film patches 360. Cutting device 354 transfers film patches 360 to film sheet roller 356 via air distribution system 358, and film sheet roller 356 transports and applies film patch 360 via air distribution system 358.

After applicator station 312 applies film patch 360 to blank 10, heat-reflective blank 11 is formed. Heat-reflective blanks 11 are then transferred from applicator station 312 to ejection station 314 for ejection from machine 300. In the exemplary embodiment, ejection station 314 stacks heat-reflective blanks 11 for ejection from machine 300. More specifically, heat-reflective blanks 11 are initially shingled on stacking table 370 and moved into accumulator 368, which counts a predetermined number of blanks 11 for stacking on exit conveyor 322. Within accumulator 368, spring bars 376 properly shingle blanks 11 for final stacking on exit conveyor 322. Ejector 378 and/or hold-down rollers 380 eject the predetermined number of blanks 11 into stack 374 on exit conveyor 322. Alternatively, blanks 11 are stacked on exit conveyor 322 from applicator station 312 or from stacking table 370, and sensor and/or a counter 384 is used to form stack 374 of a predetermined number of blanks 11.

Figure 17:
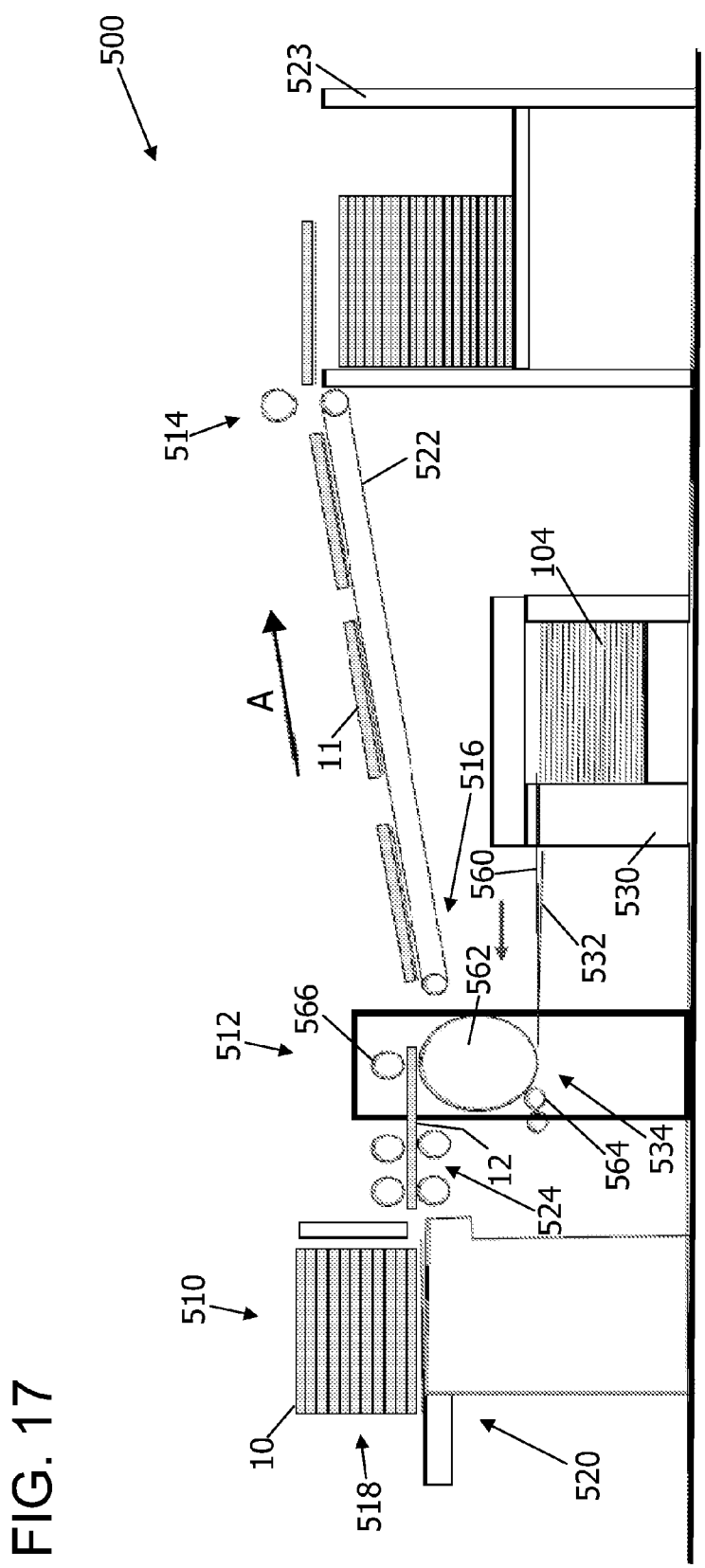

FIG. 17 is a schematic side view of a machine 500 for forming heat-reflective blank 11 from blank 10 and thermal film 104. Machine 500 is an alternative embodiment to machine 300 (shown in FIG. 3). Many of the elements included within machine 500 are similar to elements included within machine 300. As explained below, one of the differences between machine 500 and machine 300 is that machine 500 includes a laminator that is configured to apply glue or an adhesive to thermal film 104 before laminating thermal film 104 to blank 10 for forming heat-reflective blank 11.

Referring to FIG. 17, machine 500 includes an intake station 510, an applicator station 512, and an ejection station 514. More specifically, intake station 510, applicator station 512, and ejection station 514 are connected by a transport system 516, such as any suitable conveyor(s) and/or motorized device(s) configured to move blank 10 and/or heat-reflective blank 11 through machine 500. In this alternative embodiment, intake station 510 is configured to store a stack 518 of blanks 10 in a substantially horizontal orientation and/or receive blanks 10 from an upstream machine and/or process. In the embodiment that includes a hopper 520, blanks 10 are stored with interior surface 12 facing downwards. Alternatively, blanks 10 are fed, interior surface 12 downwards, from an upstream machine that forms blanks 10 from sheet material. Applicator station 512 is generally aligned with and downstream of intake station 510 and includes any suitable number and/or configuration of components, such as rollers, actuators, pumps, and/or other devices for applying thermal film 104 to blank 10. In the shown embodiment, ejection station 514 is configured to eject heat-reflective blanks 11 from machine 500. More specifically, in the shown embodiment, ejection station 514 includes at least an exit conveyor 522 and a stacker 523. Exit conveyor 522 is a component of transport system 516.

During operation of machine 500 to form heat-reflective blanks 11 from blanks 10, blanks 10 are received within intake station 510. Transport system 516 feeds blanks 10 from intake station 510 into applicator station 512. Within applicator station 512, thermal film 104 is coated with glue and applied to interior surface 12 of blank 10 to form heat-reflective blank 11. Heat-reflective blanks 11 are ejected from machine 500 at ejection station 514. A subsequent blank 10 is transferred from intake station 510 into applicator station 512 such that heat-reflective blanks 11 are formed continuously by machine 500.

In the alternative embodiment shown in FIG. 17, intake station 510 may include a separator 524. Separator 524 is similar to and includes the elements of separator 324 as described above (shown in FIG. 4). Intake station 510 includes hopper 520. Stack 518 of blanks 10 are stored horizontally within hopper 520; however, hopper 520 can be omitted and blanks 10 can be fed to separator 524 from an upstream machine. Transport system 516 is configured to remove a blank 10 from a bottom of stack 518 and transport blank 10 to separator 524. Separator 524 is configured to provide predetermined spacing between blanks 10 being fed into applicator station 512 such that thermal film 104 is applied properly. Further, separator 524 aligns blanks 10 properly for feeding into applicator station 512.

In the alternative embodiment, applicator station 512 includes a film feeder 530, a film conveyor 532, and a laminator 534. Film feeder 530 is configured to store and feed a single film patch 560 onto film conveyor 532, which transports film patch 560 to laminator 534. In another embodiment, machine 500 includes a film roll (not shown) similar to film roll 336, wherein a film patch 560 is cut from the film roll and film patch 560 is transported to laminator 534 for applying to blank 10.

Laminator 534 includes a roller 562 and a glue applicator 564 for applying glue or other adhesive to film patch 560. Roller 562 is configured with an air distribution system that is similar to the one described above. Specifically, film patch 560 is transported to roller 562 which vacuums film patch 560 onto roller 562 and past glue applicator 564. Applicator 564 applies glue to the interior surface of film patch 560, while the exterior surface of film patch 560 is adjacent to roller 562. After glue applicator 564 applies glue to interior surface of film patch 560, roller 562 rotates and transports, using the air distribution system, film patch 560 into contact with blank 10 which is simultaneously being transported toward roller 562 such that the glued interior surface of film patch 560 comes into contact with interior surface 12 of blank 10. Roller 562 and pressing roller 566 then apply pressure to blank 10 and film patch 560 such that blank 10 and film patch 560 are laminated to one another. At substantially the same time that blank 10 with film patch 560 attached thereto exits the applied force of roller 562 and pressing roller 566, the air distribution system releases the vacuum applied to film patch 560 such that heat-reflective blank 11 is formed and placed on exit conveyor 522.

Film patch 560 is also configured to maximize the reflection of heat from the contents of container 200. For example, film patch 560 can be square, rectangular, circular, and/or any suitable shape that enables maximum reflection of heat from a pizza onto the pizza. In one embodiment, when the pizza is substantially square, film patch 560 is substantially square and, when the pizza is substantially circular, film patch 560 is substantially circular.

Ejection station 514 then transports heat-reflective blank 11 as described above for ejection station 314.

Although at least two specific machines are described above, it should be understood that any machine that applies a patch of film material to an interior surface of a top panel of a blank can be used to form heat-reflective blank 11 having thermal film 104.

The above-described method and machine enable mass production of a heat-reflective blank including a thermal film coupled thereto. More specifically, by using the method and/or machine described herein, the thermal film is applied to a blank in a timely and cost effective manner. Further, the above-described machine applied the thermal film to a blank formed from a thicker corrugate material, rather than to a blank formed from thinner paperboard material. More specifically, the hold-down bars described herein maintain a spacing of blanks being fed into an applicator station, and the spring bars described herein properly stack the blanks after the thermal film has been applied thereto.

Exemplary embodiments of a machine and a method for forming a heat-reflective blank are described above in detail. The machine and method are not limited to the specific embodiments described herein, but rather, components of the machine and/or steps of the method may be utilized independently and separately from other components and/or steps described herein. For example, the methods may also be used in combination with other windowing machine and methods, and are not limited to practice with only the machine and method as described herein. For example, at least some components of the machine described herein can be used with other machines. Rather, the exemplary embodiment can be implemented and utilized in connection with many other film applying applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine for continuously forming heat-reflective blanks, the heat-reflective blanks each including a blank of sheet material and a thermal film patch coupled to the blank of sheet material, the machine comprising:

an intake station configured to align a first blank of sheet material and a second blank of sheet material for application of a first thermal film patch and a second thermal film patch, respectively, wherein the intake station is further configured to maintain a spacing between the first blank and the second blank, the intake station comprising adjustable hold-down bars for maintaining an alignment and the spacing of the first and second blanks;

an applicator station configured to apply the first and second thermal film patches to the first and second blanks, respectively, to form a first heat-reflective blank and a second heat-reflective blank, said applicator station comprising:
  a cutting device for cutting each film patch from a film roll;
  a film roller for applying the thermal film patch to each of the first blank and the second blank to form the first heat-reflective blank and the second heat-reflective blank; and
  an air distribution system for transferring each thermal film patch from the cutting device to one of the first blank and the second blank via the film roller; and
an ejection station configured to eject the first and second heat-reflective blanks from the machine.

2. A machine in accordance with claim 1, wherein the hold-down bars are vertically and horizontally adjustable with respect to a frame of the intake station.

3. A machine in accordance with claim 1, wherein the intake station comprises a separator comprising a spacing conveyor for transporting the first and second blanks into the applicator station, the hold-down bars holding the first and second blanks against the spacing conveyor during transport into the applicator station.

4. A machine in accordance with claim 3, wherein the spacing conveyor comprises a feed chain and a plurality of lugs coupled to the feed chain, each lug of the plurality of lugs spaced apart from adjacent lugs with respect to a length of the feed chain, the plurality of lugs configured to space the first and second blanks apart along the feed chain.

5. A machine in accordance with claim 1, wherein the applicator station further comprises:
  a glue applicator for applying glue to the first and second blanks, the glue is applied in a predetermined pattern
  wherein each thermal film patch is sized to correspond with the predetermined glue pattern.

6. A machine in accordance with claim 5, wherein the film roll is supported on a solid shaft.

7. A machine in accordance with claim 1, wherein the applicator station comprises:
  a laminator comprising a laminating roller, a glue applicator, and a pressing roller,
  wherein the glue applicator is configured to apply glue to at least one side of the first and second thermal film patches,
  the laminating roller configured to position the first and second thermal film patches in a predetermined location on the first and second blanks of sheet material, respectively, and
  the laminating roller and the pressing roller configured to apply a force to laminate the first and second thermal film patches to the first and second blanks of sheet material, respectively.

8. A machine in accordance with claim 1, wherein the ejection station comprises an accumulator configured to accumulate a predetermined number of heat-reflective blanks for discharge into a stack of heat-reflective blanks, the accumulator comprising spring bars for shingling the predetermined number of heat-reflective blanks within the accumulator.

9. A machine in accordance with claim 8, wherein the ejection station further comprises at least one hold-down roller configured to guide the shingled heat-reflective blanks into the stack of heat-reflective blanks.

10. A machine in accordance with claim 1, wherein the intake station further comprises a hopper for storing a plurality of blanks of sheet material in a substantially horizontal orientation, an interior surface of each blank in the hopper facing upwards.

11. A machine for forming a heat-reflective blank, the heat-reflective blank comprising a blank of sheet material and a thermal film patch coupled to the blank, the machine comprising:
  a separator comprising a frame, a spacing conveyor, and hold-down bars, wherein the hold-down bars are adjustable with respect to the spacing conveyor to maintain at least one of an alignment and a position of a blank on the spacing conveyor, the hold-down bars being vertically and horizontally adjustable with respect to the frame of the separator;
  a glue applicator configured to apply glue to a surface of at least one of the blank and the thermal film patch;
  a film applicator comprising:
    a cutting device for cutting the thermal film patch from a film roll;
    a film roller for applying the thermal film patch to the blank using the glue to adhere the thermal film patch to the blank to form the heat-reflective blank; and
    an air distribution system for transferring the thermal film patch from the cutting device to the blank via the film roller; and
  an exit conveyor configured to remove the heat-reflective blank from the machine.

12. A machine in accordance with claim 11, wherein the glue applicator further comprises a glue stencil for applying a predetermined pattern of glue to the blank.

13. A machine in accordance with claim 11, wherein the glue applicator is configured to apply glue to a surface of the thermal film patch; and
  the film applicator comprises a laminating roller and a pressing roller, wherein the laminating roller is configured to position the thermal film patch in a predetermined location on the blank, and
  the laminating roller and the pressing roller are configured to laminate the thermal film patch to the blank.

14. A machine in accordance with claim 11, further comprising an accumulator positioned between the film applicator and the exit conveyor, the accumulator accumulates a predetermined number of heat-reflective blanks and discharges the heat-reflective blanks into a stack of heat-reflective blanks on the exit conveyor, the accumulator comprising spring bars for shingling the heat-reflective blanks within the accumulator.

15. A machine in accordance with claim 14, further comprising at least one hold-down roller configured to guide the shingled heat-reflective blanks into the stack of heat-reflective blanks, the hold-down roller having a predetermined weight for transferring a predetermined number of heat-reflective blanks from the accumulator to the exit conveyor.

16. A machine in accordance with claim 14, further comprising a stacking table positioned between the film applicator and the accumulator, the stacking table for initially shingling the heat-reflective blanks.

17. A machine in accordance with claim 11, wherein the spacing conveyor comprises a feed chain and a lug coupled to the feed chain, the lug configured to maintain a position of the blank with respect to the feed chain.

* * * * *